United States Patent [19]
Ohsuga et al.

[11] Patent Number: 5,850,816
[45] Date of Patent: Dec. 22, 1998

[54] METHOD FOR STRATIFYING AIR-FUEL MIXTURE IN DIRECT FUEL INJECTION INTERNAL COMBUSTION ENGINE AND ELECTRONIC SYSTEM ENGINE CONTROL APPARATUS USING ABOVE METHOD

[75] Inventors: Minoru Ohsuga, Hitachinaka; Takuya Shiraishi, Kashima; Yoko Nakayama, Hitachi; Mamoru Fujieda, Tomobe-machi, all of Japan

[73] Assignee: Hitachi, Ltd., Japan

[21] Appl. No.: 833,524

[22] Filed: Apr. 7, 1997

[30] Foreign Application Priority Data

Apr. 5, 1996 [JP] Japan ................................. 8-083529

[51] Int. Cl.⁶ .................................................. F02B 17/00
[52] U.S. Cl. .......................... 123/430; 123/295; 123/301; 123/302
[58] Field of Search ..................... 123/430, 295, 123/301, 302, 308, 306

[56] References Cited

U.S. PATENT DOCUMENTS 5,086,737  2/1992  Watanabe et al. .................. 123/295
5,553,588  9/1996  Gono et al. ......................... 123/276

FOREIGN PATENT DOCUMENTS 2-125911  5/1990  Japan .
3-33424   2/1991  Japan .
3-33449   2/1991  Japan .
5-18244   1/1993  Japan .
5-33739   2/1993  Japan .

*Primary Examiner*—Willis R. Wolfe
*Assistant Examiner*—Hieu T. Vo
*Attorney, Agent, or Firm*—Evenson, McKeown, Edwards & Lenahan, P.L.L.C.

[57] ABSTRACT

Swirl strength is formed to be 1–3.5, and the fuel mist speed of the fuel to be injected into a combustion chamber is formed to be 5–37 m/s or 5–25 m/s, whereby the air fuel ratio (A/F) is used as the lean limitation. Further, a control apparatus determines a lean combustion region according to the swirl strength and the fuel mist speed. By paying using the injection speed of the fuel, the rich air-fuel mixture and the lean air-fuel mixture are stratified by the combination of the swirl shape (the swirl strength) and the fuel mist speed.

24 Claims, 15 Drawing Sheets

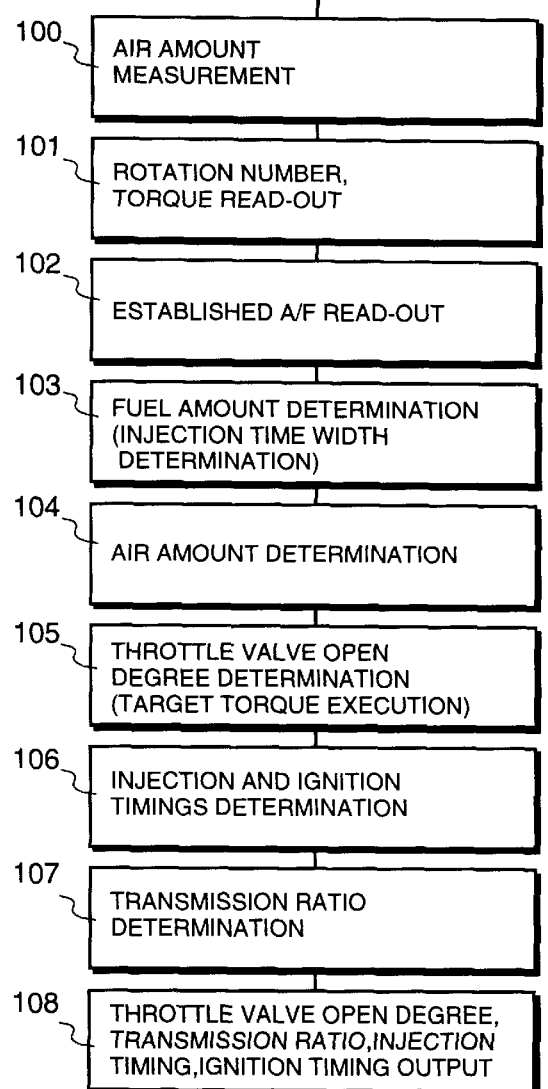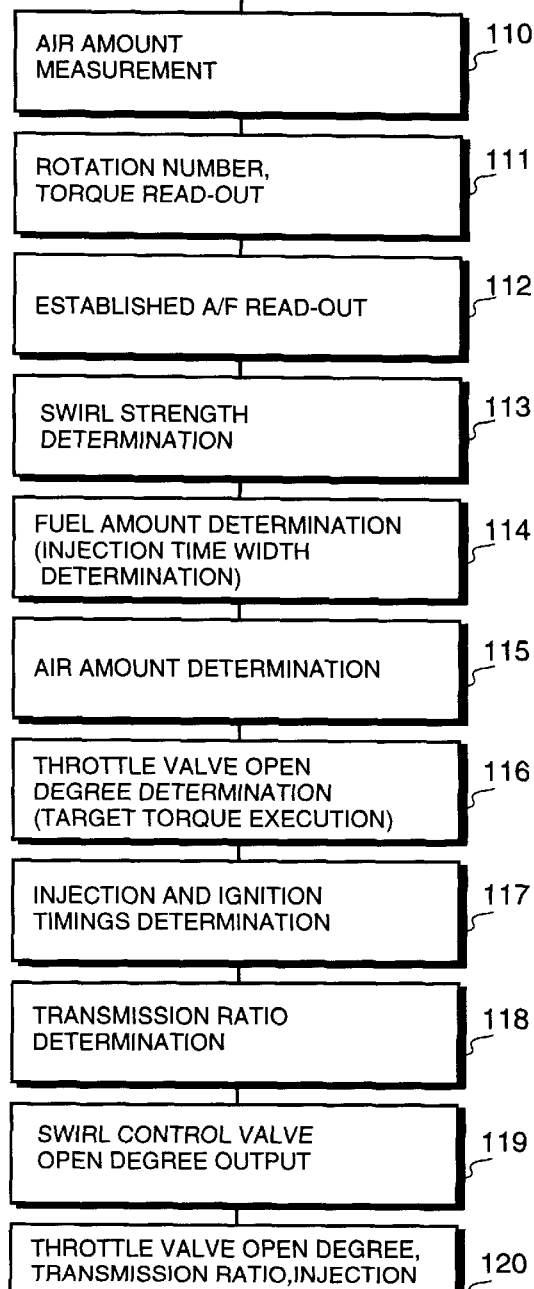

METHOD FOR STRATIFYING AIR-FUEL MIXTURE IN DIRECT FUEL INJECTION INTERNAL COMBUSTION ENGINE AND ELECTRONIC SYSTEM ENGINE CONTROL APPARATUS USING ABOVE METHOD

BACKGROUND AND SUMMARY OF THE INVENTION

The present invention relates to a method for stratifying an air-fuel mixture in a direct fuel injection internal combustion engine for use in an automobile and an electronic system internal combustion engine control apparatus using such method in a direct fuel injection internal combustion engine used in an automobile wherein the fuel is injected directly to a combustion chamber of an internal combustion engine and an output is obtained by sparking and combusting the air-fuel mixture of air and fuel which is sparked by an ignition plug, etc.

A conventional direct fuel injection internal combustion engine is disclosed, for example in Japanese patent laid-open publication No. 125,911/1990, in which during a low load time the fuel is injected to an apex face of a piston in a hollow form combustion chamber. A strong swirl is generated and also during a heavy load the fuel is injected to the apex face of the piston and a weak swirl is generated, thereby a high output can be obtained by restraining a knocking phenomenon.

Further, in a conventional direct fuel injection internal combustion engine disclosed in, for example, Japanese patent laid-open publication No. 33,424/1991 and Japanese patent laid-open publication No. 33,449/1991, a lengthwise component swirl or a lateral component swirl is generated and a stable spark combustion is performed, thereby an improvement of a combustion chamber shape to carry out a good stratification combustion can be obtained.

Further, in a conventional direct fuel injection internal combustion engine disclosed in, for example Japanese patent laid-open publication No. 18,244/1993, a combustion chamber shape is formed to an air-fuel mixture to enable fine sparking around a surrounding portion of an ignition plug regardless of a fuel injection amount.

With the combustion chamber shape structure of the conventional direct fuel injection internal combustion engine, where the fuel injection amount is less than a predetermined value, all the injection fuel, which has collided with a dent portion of a lower wall face provided on an upper face of a piston, does not scatter or diffuse but can proceed toward a dent portion of an end portion of a lower side of the ignition plug.

Further, in a conventional direct fuel injection internal combustion engine disclosed in, for example Japanese patent laid-open publication No. 33,739/1993, a compact direct fuel injection internal combustion engine type fuel injector is formed with a simple structure and the injection fuel is fine-grained by an assist air.

Up to now, in the conventional direct fuel injection internal combustion engine, an improvement of a combustion chamber structure for enlarging a lean limitation air-fuel ratio (a lean limitation A/F), an improvement in forming the swirl and a most suitable shape of a head portion of a piston for injecting and maintaining the swirl have been proposed.

An object of the present invention is to provide a method for stratifying an air-fuel mixture in a direct fuel injection internal combustion engine wherein, paying an attention to the injection speed of the fuel, a stratification of the air-fuel mixture can be attained so that the fuel does not collide with a head portion of a piston with a combination of a swirl shape or a swirl strength and a fuel mist speed of the fuel and thereby a lean combustion can be obtained.

Another object of the present invention is to provide an electronic system internal combustion engine control apparatus for realizing the stratifying method.

A further object of the present invention is to provide a method for stratifying an air-fuel mixture in a direct fuel injection internal combustion engine wherein a discharging amount of NOx can be reduced to a lean combustion state.

According to the present invention, in a method for stratifying an air-fuel mixture in a direct fuel injection internal combustion engine in which an air-fuel mixture is formed by generating a swirl of air in a combustion chamber of the direct fuel injection internal combustion engine and by injecting fuel, the combustion is carried out using the air-fuel mixture.

The method for stratifying the air-fuel mixture in the direct fuel injection internal combustion engine comprises the steps of generating a swirl at a surrounding portion of the combustion chamber by air which is inhaled in the combustion chamber, fuel-misting the fuel toward a center portion of the swirl using an injector, forming a rich air-fuel mixture at a center region of the combustion chamber, the rich air-fuel having a weight ratio between the air and the fuel of substantially 14.7, and forming a lean air-fuel mixture at a swirl existence region, the lean air-fuel ratio having a weight ratio between the air and the fuel having more than 14.7, enclosing the rich air-fuel mixture by the lean air-fuel mixture to direct to a head portion of a piston from the injector, recognizing a weight ratio between an amount of the air and an amount of the fuel mist of the fuel as a low concentration combustion limitation when the above stated conditions are satisfied, and controlling the combustion of the direct fuel injection internal combustion engine using the obtained value of the low concentration combustion limitation.

According to the present invention, a lengthwise component swirl or a lateral component swirl is formed in a direct fuel injection internal combustion engine and the low speed fuel is fuel-misted to a center portion of the swirl, thereby a scattering of the fuel mist can be prevented and a rich air-fuel mixture can be maintained around a center portion of a combustion chamber.

In an intake stroke injection under a low fuel pressure, a stratification of the fuel in the direct fuel injection internal combustion engine is desirable to maximize swirl strength.

So as to obtain the above stated method or steps, a combination range between a swirl strength and a fuel mist speed is selected, such a swirl strength being defined by a swirl number with one reciprocation (or one crank rotation) of a piston of the internal combustion engine.

In the case where the lengthwise component swirls, a combination between fuel mist speed and an existence of the lengthwise component swirl from a head portion of a piston directing toward a center portion of a combustion chamber, namely a returning direction directing to an injector, is selected.

According to the present invention, a specific method for stratifying an air-fuel mixture of a direct fuel injection internal combustion engine has the following structural elements and an electronic system internal combustion engine control apparatus using the above method can be provided.

(1) In the method for stratifying the air-fuel mixture in the direct fuel injection internal combustion engine according to the combustion of the air-fuel mixture, the lateral component swirl (vortex) is generated at the periphery of the combustion chamber by the inhale or intake air into the combustion chamber, the fuel is fuel-misted toward the center portion of the lateral component swirl, thereby the rich air-fuel mixture is formed at the center portion of the combustion chamber and the lean air-fuel mixture is formed at the swirl portion.

The swirl strength defined by the swirl number per one reciprocation of the piston of the internal combustion engine is 1–3.5, and the fuel mist speed of the fuel to be injected into the combustion chamber and having the mean particle size diameter of 30 $\mu$m is 5–37 m/s. The rich air-fuel mixture is enclosed by the lean air-fuel mixture directed toward the head portion of the piston from the injector and where at least two above conditions are satisfied, the air-fuel ratio (A/F) is the lean combustion limitation.

(2) In the method for stratifying the air-fuel mixture in the direct fuel injection internal combustion engine according to the combustion of the air-fuel mixture, the lateral component swirl is generated at the periphery of the combustion chamber by the intake air into the combustion chamber, the fuel is fuel-misted toward the center portion of the lateral component swirl, thereby the rich air-fuel mixture is formed at the center portion of the combustion chamber and the lean air-fuel mixture is formed at the swirl portion.

The swirl strength defined by the swirl number per one reciprocation of the piston of the internal combustion engine is 1–3.5, and the fuel mist speed of the fuel to be injected into the combustion chamber and having the mean particle size diameter of 30 $\mu$m is 5–25 m/s. The rich air-fuel mixture is enclosed by the lean air-fuel mixture directed toward the head portion of the piston from the injector, and where at least two of the above conditions are satisfied, the air-fuel ratio (A/F) is more than in the lean combustion limitation.

(3) In the method for stratifying the air-fuel mixture in the direct fuel injection internal combustion engine according to the combustion of the air-fuel mixture, the lengthwise component swirl is generated at the periphery of the combustion chamber by the intake air into the combustion chamber, the fuel is fuel-misted toward the center portion of the lengthwise component swirl, thereby the rich air-fuel mixture is formed at the center portion of the combustion chamber and the lean air-fuel mixture is formed at the swirl portion.

The lengthwise component swirl is formed from the head portion of the piston to the center portion of the combustion chamber, namely the returning direction toward the injector, and the fuel mist speed of the fuel to be injected into the combustion chamber and having the mean particle size diameter of 30 $\mu$m is 5–37 m/s. The rich air-fuel mixture is enclosed by the lean air-fuel mixture directed toward the head portion of the piston from the injector, and where at least two of the above conditions are satisfied, the air-fuel ratio (A/F) is becomes the lean combustion limitation.

(4) In the method for stratifying the air-fuel mixture in the direct fuel injection internal combustion engine according to the combustion of the air-fuel mixture, the lengthwise component swirl is generated at the periphery of the combustion chamber by the intake air into the combustion chamber, the fuel is injected toward the center of the lengthwise component swirl, thereby the rich air-fuel mixture is formed at the center portion of the combustion chamber and the lean air-fuel mixture is formed at the swirl portion.

The lengthwise component swirl is formed from the head portion of the piston to the center portion of the combustion chamber, namely the returning direction toward the injector, and the fuel mist speed of the fuel to be injected into the combustion chamber and having the mean particle size diameter of 30 $\mu$m is 5–25 m/s. The rich air-fuel mixture is enclosed by the lean air-fuel mixture directed toward the head portion of the piston from the injector, and where at least two of the above conditions are satisfied, the air-fuel ratio (A/F) becomes more than 40 in the lean combustion limitation.

(5) A very small amount of fuel is injected to the outer peripheral portion of the swirl.

(6) In the electronic system engine control apparatus used for the stratification of the air-fuel mixture in the direct fuel injection internal combustion engine according to the combustion of the air-fuel mixture, the swirl is generated at the periphery of the combustion chamber by the intake air into the combustion chamber, the fuel is injected toward the center of the swirl, thereby the rich air-fuel mixture is formed at the center portion of the combustion chamber and the lean air-fuel mixture is formed at the swirl portion.

The electronic system engine control apparatus comprises apparatus for determining the fuel injection amount according to the target torque to the engine and then engine rotation speed and for calculating the target air-fuel ratio (A/F) according to the target torque to the engine and the engine rotation speed, apparatus for determining the injection time of the injector in response to the fuel injection amount, apparatus for calculating the fuel injection timing in the intake process, and apparatus for judging the lean low concentration combustion region transfer according to the target air-fuel ratio.

(7) The electronic system engine control apparatus comprises further apparatus for determining the fuel injection amount to be injected to the outer peripheral portion of the swirl.

As stated above, where the swirl strength and the fuel mist speed are selected suitably, the fuel mist does not collide with the head portion of the piston.

The stratified rich air-fuel mixture reaches the air-fuel ratio (A/F) of more than 25, therefore the lean combination exceeding the homogenous lean combustion limitation can be obtained. Ordinarily, the homogenous lean limitation is an air-fuel ratio (A/F) of 23–25. The fuel mist speed of the fuel commonly uses a mean speed of a portion from 10 mm to 40 mm starting from a fuel mist port of the injector. According to the present invention, the fuel mist speed follows the above stated definition.

The above stated value 5 m/s in the fuel mist speed is determined by a relationship of the installation position of the ignition plug, and the above stated value 37 m/s is the speed in which the fuel does not collide with the head portion of the piston and is determined according to experimentation. The fuel mist speed of 5–25 m/s exists at a desirable practical use range.

The lean limitation air-fuel ratio (the lean limitation A/F) is 25, according to the present invention, the lean limitation air-fuel ratio (the lean limitation A/F) can be enlarged and can be more than 40. Accordingly, in a case where the lean combustion is carried out, within the lean combustion limitation the air-fuel ratio (A/F) of more than 40 can be established.

The radial direction distribution of the fuel mist to be injected from the injector is selected, then the very low concentration air-fuel mixture is distributed around the outer periphery of the swirl and the condensed high concentration air-fuel mixture is distributed around the center portion of the swirl, therefore NOx discharge amount can be reduced. As a result, the amount of NOx discharge during the lean driving operation can be reduced. Further, with the above stated features and advantages, the fuel consumption can be reduced and then the engine efficiency can be improved.

In a case where the present invention is employed, to heighten the swirl strength of the center portion of a respective cylinder, a convex type piston is used in which a center portion of the piston head is heightened more than an outer edge height of the piston.

BRIEF DESCRIPTION OF DRAWINGS

FIG. 17A is one embodiment of a control flow chart;

FIG. 17B is another embodiment of a control flow chart;

DETAILED DESCRIPTION OF THE DRAWINGS

Hereinafter, a first embodiment of a method for stratifying an air-fuel ratio in a direct fuel injection internal combustion engine and an electronic system engine control apparatus in a direct fuel injection internal combustion engine according to the present invention will be explained referring to drawings.

Figure 1A:
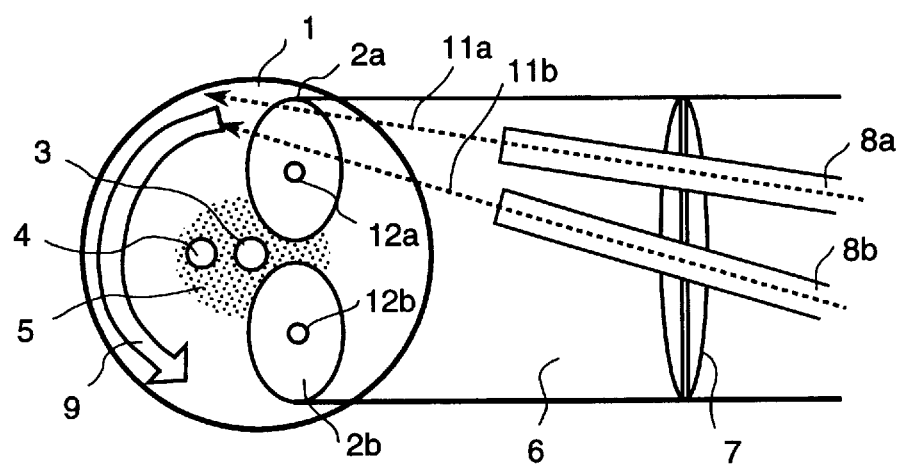
FIG. 1A is a schematically structural plan view showing a first embodiment of an intake system of a direct fuel injection internal combustion engine according to the present invention.
Figure 1B:
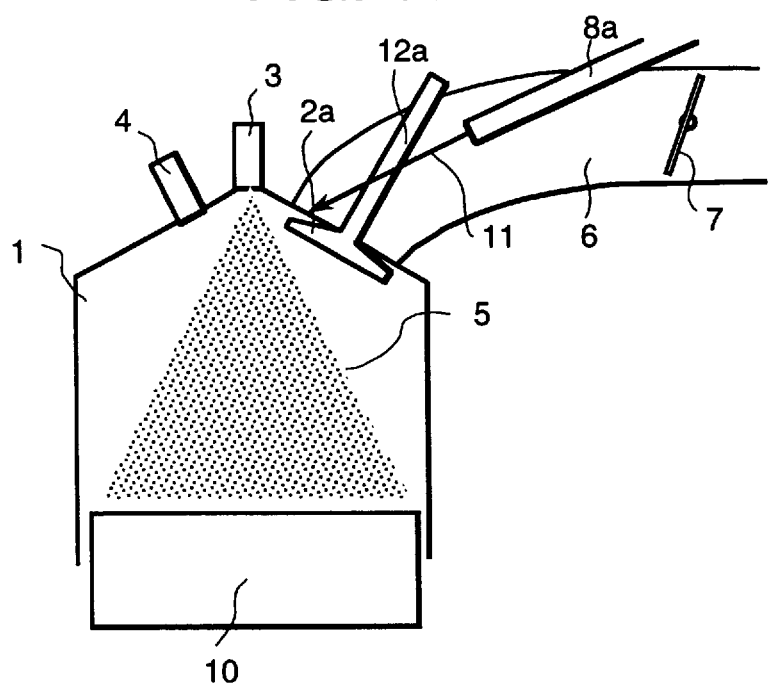
FIG. 1B is a schematically structural side view showing a first embodiment of an intake system of a direct fuel injection internal combustion engine according to the present invention.

FIG. 1A and FIG. 1B show a first embodiment of an intake system in a method for stratifying an air-fuel ratio in a direct fuel injection internal combustion engine and an electronic system engine control apparatus in a direct fuel injection internal combustion engine according to the present invention.

An internal combustion engine has a combustion chamber 1 and two intake valves 2a, 2b provided on the combustion chamber 1. A fuel injector 3 and an ignition plug 4 are provided on the combustion chamber 1. The present invention provides a direct fuel injection internal combustion engine where the fuel is injected directly to the combustion chamber 1 by the fuel injector 3. The fuel injected from the fuel injector 3 forms a fuel mist 5 in the combustion chamber 1. An intake pipe 6 provides a control valve 7 for controlling an air flow and two auxiliary passages 8a, 8b for bypassing the control valve 7.

By the air flow passing through the auxiliary passage 8, a swirl flow of air, namely a swirl 9 is formed in the combustion chamber 1. In the embodiment according to the present invention, the swirl has the 17 lateral component as a main component and the lengthwise component. In accordance with a combination of the characteristic of the swirl 9 and the characteristic of the fuel mist 5, the fuel is concentrated around a surrounding portion of the ignition plug 4 and then a stratification can be attained. The internal combustion engine has a piston 10 and this piston 10 has a flat form head portion shape.

In this embodiment shown in FIG. 1A and FIG. 1B, the fuel injection 3 and the ignition plug 4 are provided at a center portion vicinity and at an upper portion of the combustion chamber 1. With this structure, the fuel can be concentrated easily at the center portion and the fuel can be stratified easily around the vicinity of the ignition plug 4.

In this embodiment shown in FIG. 1A and FIG. 1B, the auxiliary passages 8a and 8b may be constituted by a single passage or a plural number of passages. A direction 11 of the air flow blown from the auxiliary passage 8 is directed toward an upper portion of the intake valves 2a, 2b of a wall side of the combustion chamber 1 by two valve stems 12a, 12b of the respective intake valves 2a, 2b.

As shown in FIG. 1B, the direction 11 of the air flow of the auxiliary passages 8a, 8b is directed toward a gap which is formed by an opening state of the intake valves 2a, 2b and then the air can be inhaled with an excellent efficiency and the swirl 9 can form surely in the combustion chamber 1. During a closing state of the control valve 7, the air is supplied through the auxiliary passages 8a, 8b.

Figure 2:
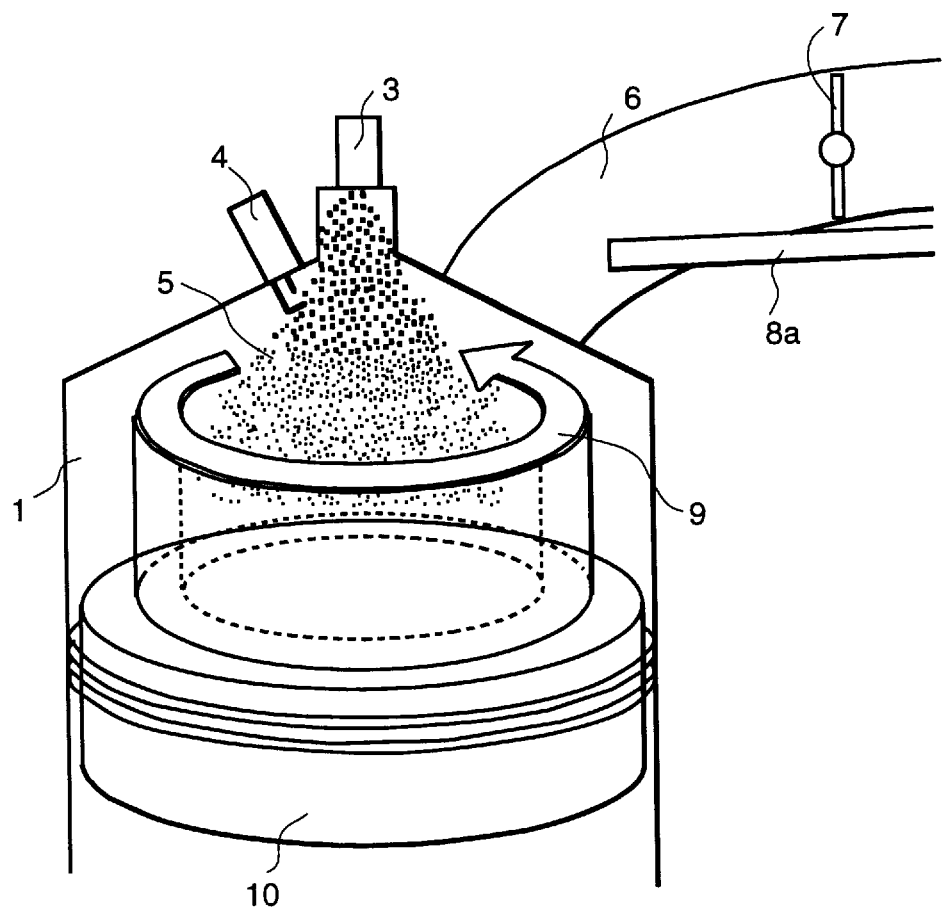
FIG. 2 is a schematic view showing the general principle of an air-fuel mixture state and a stratification in a cylinder of the direct fuel injection internal combustion engine.

FIG. 2 shows a detailed view of the combustion chamber 1. The swirl 9 is formed in the combustion chamber 1 by the auxiliary passages 8a, 8b provided on the intake pipe 6. The fuel mist 5 of the fuel is injected at the center portion of the swirl 9 by the fuel injector 3.

The fuel mist 5 is shut in or is closed at the cylindrical center portion of the swirl 9 according to an action of the cylindrical form swirl or vortex 9. When the injection timing is carried out at an intake stroke operation of the internal combustion engine, by the action of the swirl (the vortex) the fuel mist 5 is left as it is and is maintained at the center portion of the swirl 9 until a compression stroke operation.

The fuel maintained at the center portion is sparked by the ignition plug 4 provided on the center portion of the combustion chamber 1. In other words, since the fuel is stratified at the center portion of the combustion chamber 1, the combustion can be realized with a small amount fuel.

Further, as shown in FIG. 2, even when the fuel mist 5 exists only at the upper portion of the combustion chamber 1, the stratification can be achieved in an upper and lower direction. With the above structure, the combustion can also be achieved with the small fuel amount.

Herein, as stated in above, so as to shut or close in the fuel mist 5 at the center portion of the a combustion chamber 1, there are necessary conditions. Namely, the fuel mist 5 itself is carried out toward the center portion of the combustion chamber 1, the fuel mist 5 does not spread toward a left and right direction of the combustion chamber 1, and the cylindrical form swirl (vortex) 9 is formed completely.

Further, so as to stratify the fuel mist 5 in the upper and lower direction of the combustion chamber 1, as the necessary conditions, an injection initial speed of the fuel mist 5 of the fuel and a movement speed at a flying time must be fully slowed.

As a matter of course, where the fuel mist 5 is stratified toward the upper and lower direction of the combustion chamber 1, a strike amount of the fuel mist 5 with the head portion of the piston 10 must be reduced according to the evaporation. One example of a method for generating the swirl 9 is shown in FIG. 1A and FIG. 1B. Next, the speed of the fuel mist 5 will be explained.

Figure 3:
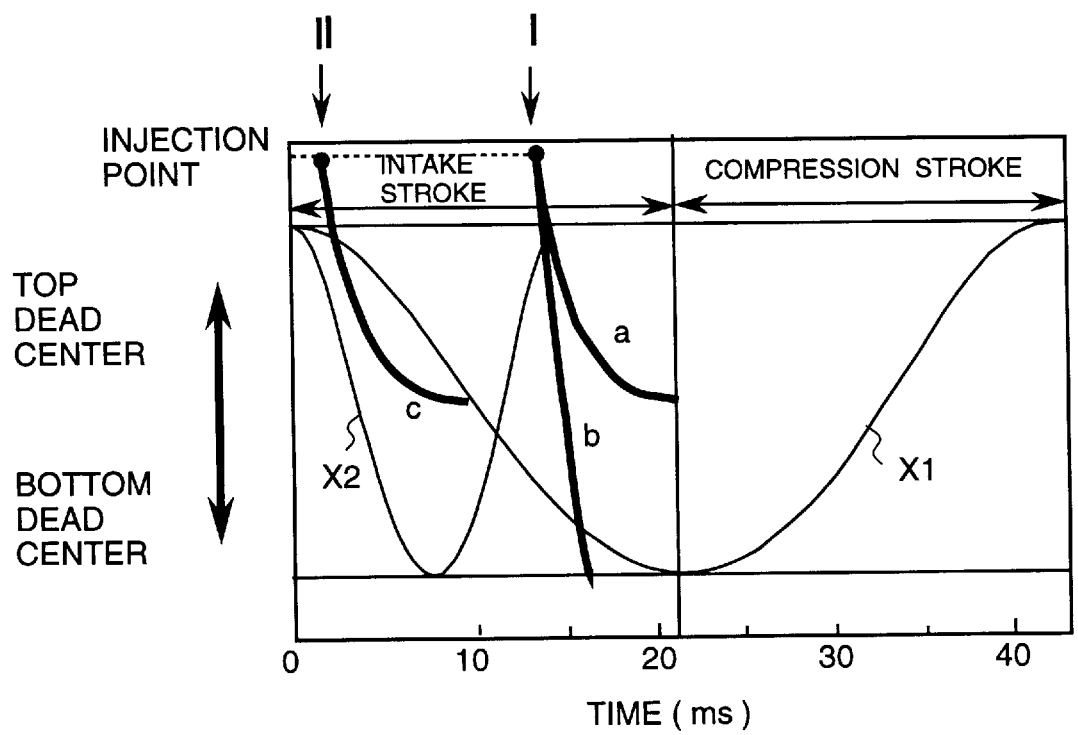
FIG. 3 is an explanatory graph showing a calculation result of a fuel mist movement.

FIG. 3 shows a movement of the position of the piston 10 and a movement of a tip end of the fuel mist 5 following along a time axis. The positions of the piston 10 are shown in a curved line X1 and a curve line X2. An engine rotation number shown in the curve line X1 is lower than an engine rotation number shown in the curve line X2. The movements of the tip end of the fuel mist 5 are shown on a curve line a, a curve line b and a curve line c.

When the rotation number is the curve line X1, the movements of the tip end of the fuel mist 5 become the curve line a and the curve line b. The curve line a shows a situation where the fuel mist speed is low, the curve line b shows a situation where the fuel mist speed is lower than the case shown in the curve line a.

In the curve line a, an injection timing I is selected, the fuel mist 5 does not collide with the piston 10. However, in case of the curve line b, the fuel mist 5 collides with the piston 10 no matter what injection timing is selected.

On the other hand, in curve line X2 having a high rotation number, when the injection timing II is selected and the fuel mist speed is the curve line c, the fuel mist 5 does not collide with the piston 10.

As a result, the larger the fuel mist speed, the more the fuel mist 5 does not collide with the piston 10. The fuel mist 5 exists at the upper portion of the combustion chamber 1, and then the stratification can be attained. However, when the fuel mist speed is too small, there is a possibility that the fuel mist 5 does not reach to an installation position of the ignition plug 4.

So to avoid the above stated possibility the fuel mist 5 must move the distance from an injection point shown in FIG. 3 to a top dead center of the piston 10. To obtain the above stated movement, it is necessary to attain the fuel mist speed of more than 5 m/s. Since the installation position of the ignition plug 4 is an upper portion space where the piston 10 reaches the top dead center, and this space must be filled up the air-fuel mixture and then the fuel mist speed must be more than 5 m/s.

Further, in the case where in particular the stratification degree heightens and the lean limitation air-fuel ratio (the lean limitation A/F) is more than 40, the air-fuel mixture must be omnipresent at the upper portion of the combustion chamber 1. In this case, it is necessary to make the fuel mist speed less than 25 m/s. A characteristic shown in the curve line 20a of FIG. 3 corresponds to the fuel mist speed of 25 m/s.

Figure 4:
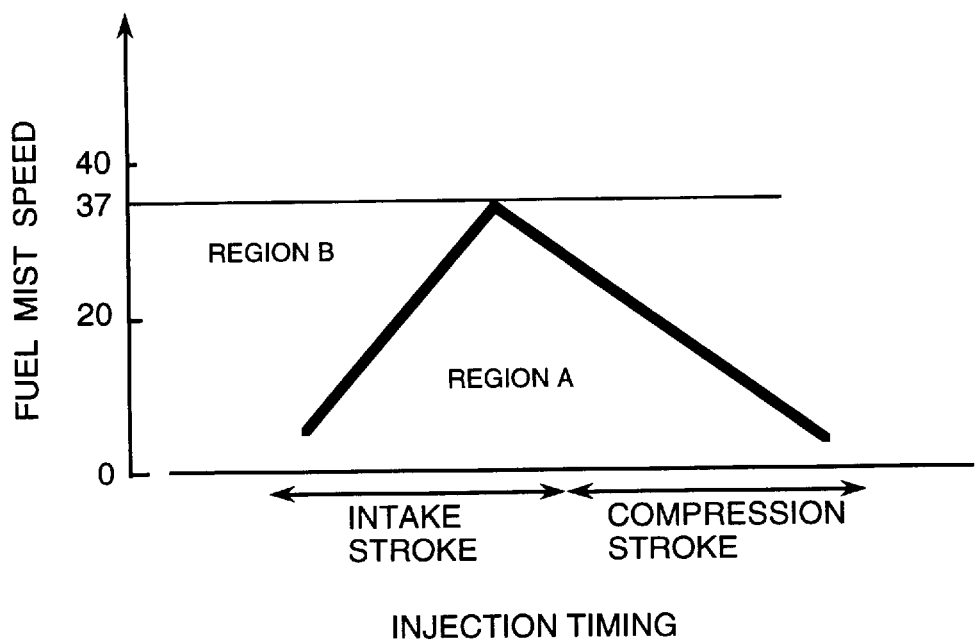
FIG. 4 is a graph showing the relationship between an injection timing and an injection speed.

FIG. 4 is a relationship graph between the injection timing and the fuel mist speed. A region A indicates a region where the fuel mist 5 does not collide with the piston 10. In another region B except for the region A, the fuel mist 5 collides with the piston 10. In other words, even when the injection timing is selected, the fuel mist 5 collides with the piston 10 at a state where the fuel mist speed exceeds more than 37 m/s.

Figure 5:
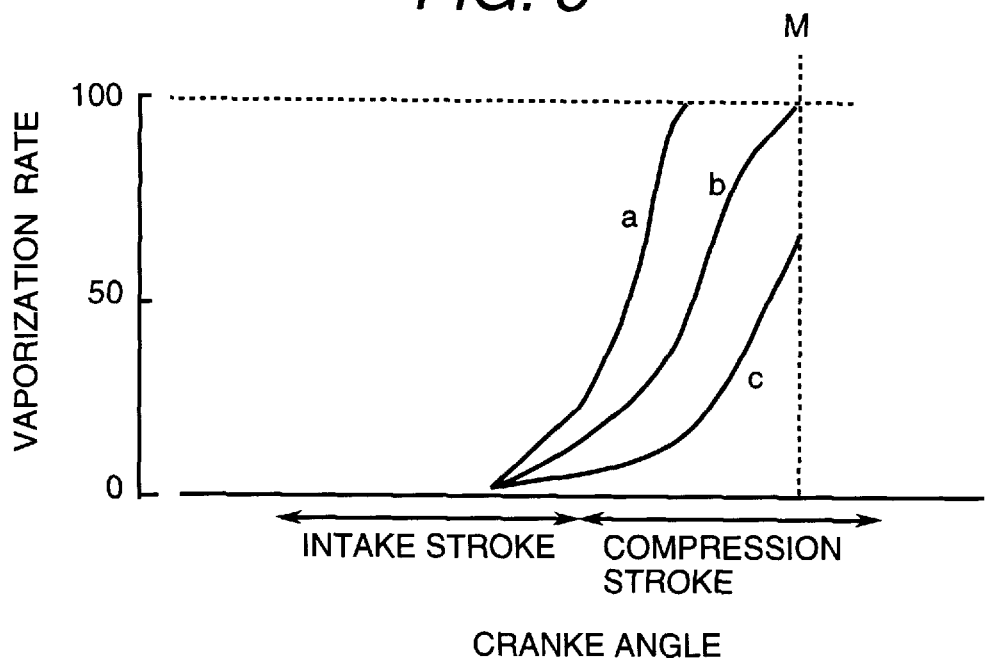
FIG. 5 is a graph showing the stratification characteristic of the fuel.

FIG. 5 shows a relationship graph between a crank angle and a vaporization rate of the fuel. At some period of the intake stroke operation, in a case where the fuel exists in the combustion chamber 1, along with a raise of the piston 10 at the intake stroke operation the fuel is heated by compression heat and a percentage of the fuel stratifies at an ignition timing M.

A particle size diameter of the fuel mist 5 of the fuel is large in a curve line a, larger in a curve line b, and largest in a curve line c in order. The fuel stratifies completely until the ignition timing as an ideal state. In the case where the fuel particle size diameter is large as shown in the curve line c, the vaporization rate of the fuel until the ignition timing becomes 70% degree. In the case where the fuel particle size diameter is small as shown in the curve line a, before the ignition timing M is reached the vaporization rate of the fuel becomes 100%.

At the movement of ignition timing M, to reach the fuel vaporization rate of 100% as shown in the curve line b, the fuel mist 5 is carried out with the particle size diameter value of 30 μm. The above stated particle size diameter value is an average value (a mean value) measured using a measurement instrument utilizing a laser beam etc., and the vaporization rate is measured on the base of the obtained value as an initial value. Namely, to stabilize the combustion at the stratification, the fuel mist 5 is required to have an average particle size diameter of less than 30 μm.

Figure 6:
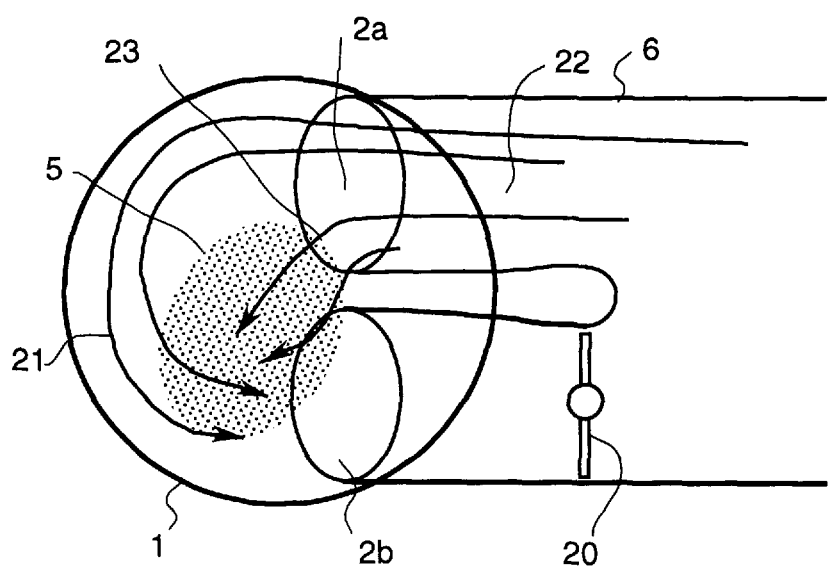
FIG. 6 is a schematically structural plan view showing a second embodiment of an intake system of a direct fuel injection internal combustion engine according to the present invention.

FIG. 6 is a second embodiment of an intake system in a method for stratifying an air-fuel ratio in a direct fuel injection internal combustion engine and an electronic system engine control apparatus in a direct fuel injection internal combustion engine according to the present invention where a shape of the intake pipe 6 for forming the swirl is shown. The intake pipe 6 provides two intake valves 2a, 2b, and a control valve 20 for closing an intake passage is provided on one of passages in the intake pipe 6. The intake air is supplied only via another passage 22.

With the above stated structure, the intake air 23 flows from an inside against the center portion of the intake valves 2a, 2b at a center side of the combustion chamber 1, and the fuel mist 5 of the fuel which is distributed at the center portion of the combustion chamber 1 is blown out. As a result, the stratification at the center portion in the combustion chamber 1 can not be attained. In other words, as an air flow 21 in the combustion chamber 1, the air flow 21 along to a surrounding portion of the combustion chamber 1 is preferable because the fuel at the center portion of the combustion chamber 1 is not blown out.

Figure 7:
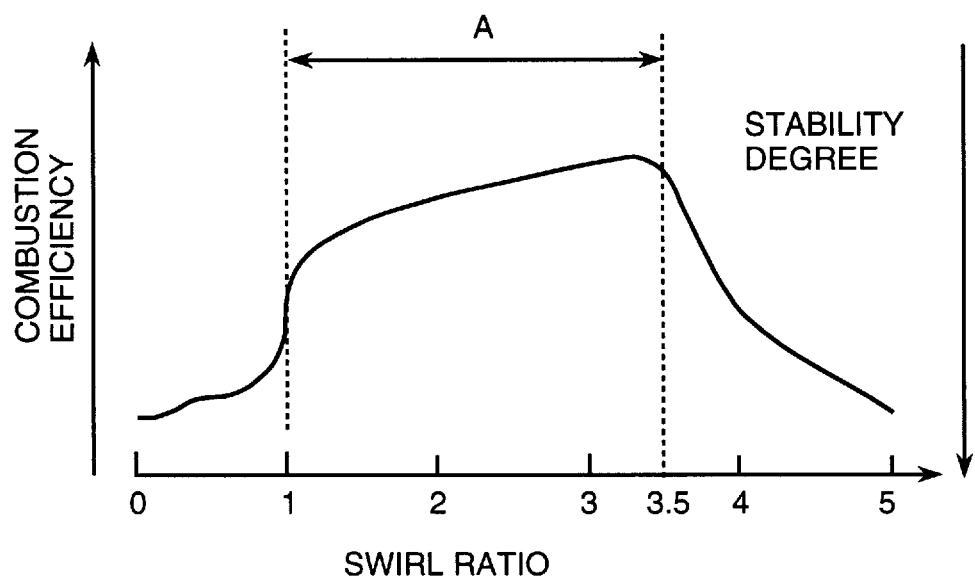
FIG. 7 is a graph showing the relationship between a swirl ratio and the combustion efficiency and the stability degree.

FIG. 7 shows a relationship graph between a swirl ratio, the combustion efficiency and the combustion stability degree. The swirl ratio indicates what the amount of rotation of the fuel in the combustion chamber is with respect to one rotation of the internal combustion engine. This swirl ratio is measured by a measurement instrument such as a swirl-meter.

When the swirl ratio is less than 1, where the air flow has not carried out one rotation in the combustion chamber 1 during one engine cycle, the swirl surrounding the fuel is not formed, and the fuel mist 5 is not stratified at the center portion of the combustion chamber 1.

On the other hand, when the swirl ratio is large and exceeds 3.5, since the combustion fire and a wall face of the combustion chamber 1 is cooled by the high speed air flow, then the combustion efficiency starts to decrease. Namely, the swirl ratio is in the most suitable range A when the swirl ratio is more than 1.0 and less than 3.5.

As understood from FIG. 7, in the case where the swirl ratio becomes larger, the combustion efficiency and the engine stability degree can be improved. This shows that when the lean limitation air-fuel ratio (the lean limitation A/F) is varied according to the driving condition, the combustion efficiency and the engine stability degree can be achieved by varying the swirl ratio. Namely, the swirl ratio can be used as a control variable for the latter stated engine control.

Figure 8A:
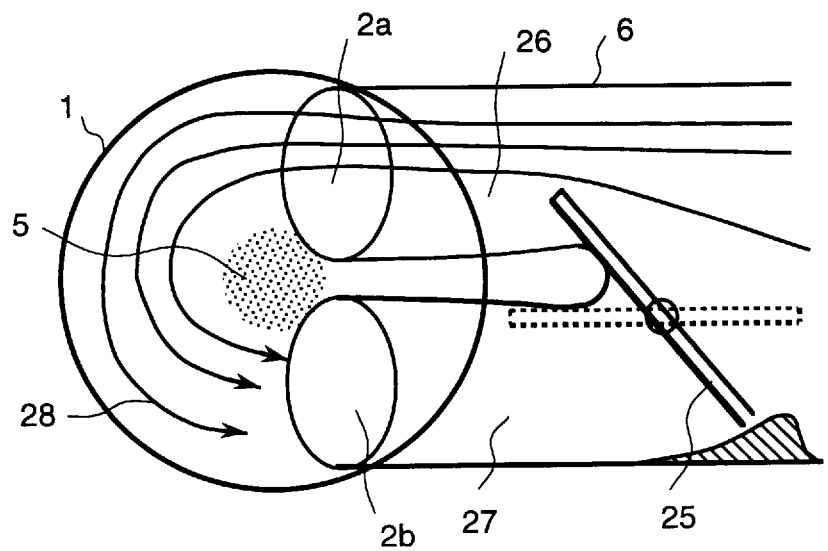
FIG. 8A is one schematically structural plan view showing a third embodiment of an intake system of a direct fuel injection internal combustion engine according to the present invention.
Figure 8B:
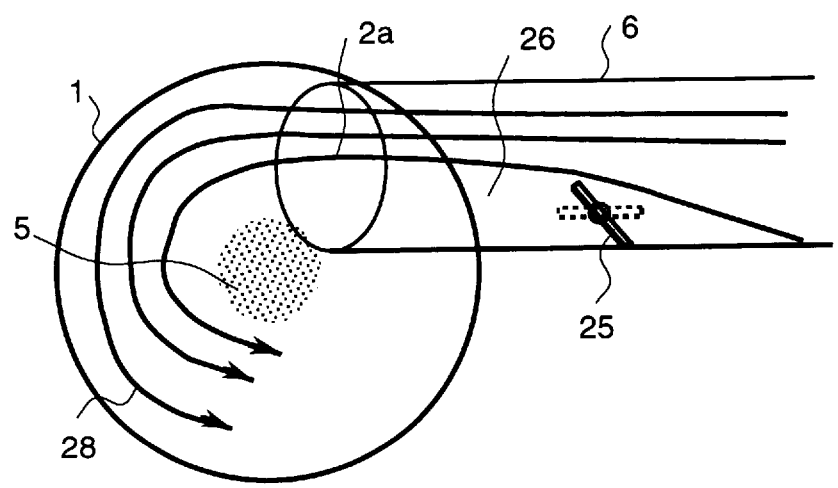
FIG. 8B is another schematically structural plan view showing a third embodiment of an intake system of a direct fuel injection internal combustion engine according to the present invention.

FIG. 8A and FIG. 8B show a third embodiment of an intake system in a method for stratifying an air-fuel ratio in a direct fuel injection internal combustion engine and an electronic system engine control apparatus in a direct fuel injection internal combustion engine according to the present invention. A control valve 25 for controlling the air flow is provided on the intake pipe 6. FIG. 8A shows two intake valves 2a, 2b provided on the internal combustion engine, and FIG. 8B shows a single intake valve 2a provided on the internal combustion engine. In either case, the control valve 25 is provided to supply the air to only the intake valve 2a at a wall side of the combustion chamber 1.

As shown in FIG. 8A, the control valve 25 closes one intake passage 27 and projects to midway of the intake passage 26. In the structure shown in FIG. 8A, the intake air 28 is supplied to only a wall side of the intake valves 2a, 2b.

In the case where the fuel is stratified and lean driving is carried out, as shown in a dotted line of FIG. 8A and FIG. 8B, the control valve 25 closes the intake passage 26. In a driving region where an output is required, since the control valve 25 becomes an obstacle, the control valve 25 runs parallel with the intake pipe 6 as shown in a dotted line in FIG. 8A and FIG. 8B, and therefore the intake air 28 flows smoothly.

In the case where the intake air 28 is supplied to the intake valve at the wall side of the combustion chamber 1, after the intake air 28 has passed the intake valves 2a, 2b, a rate for striking the intake air 28 against the fuel mist 5, which is injected against the center 0 portion of the combustion chamber 1, becomes small.

As a result, the swirl is formed effectively in the combustion chamber 1, and further the fuel mist 5 is maintained at the center portion of the combustion chamber 1. In other words, the fuel can stratify and flow to the center portion of the combustion chamber 1.

Figure 9:
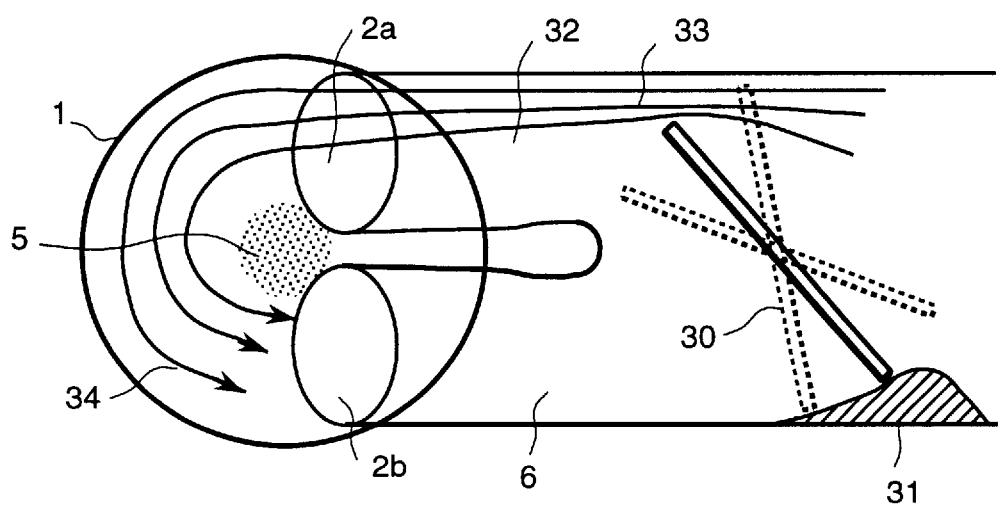
FIG. 9 is a schematically structural plan view showing a fourth embodiment of an intake system of a direct fuel injection internal combustion engine according to the present invention.

FIG. 9 shows a fourth embodiment an intake system in a method for stratifying an air-fuel ratio in a direct fuel injection internal combustion engine and an electronic system engine control apparatus in a direct fuel injection internal combustion engine according to the present invention. A control valve 30 is provided in the intake pipe 6. This control valve 30 supplies only intake air to the intake passage 32. A projection wall 31 is provided on the wall face of the intake pipe 6 which is mounted against the intake passage 32, and this projection wall 31 does not allow the intake air to flow when the control valve 30 opens.

In the case where an opening degree of the control valve 30 is small, the intake air does not flow from a side of the projection wall 31 but flows only from a side of the intake passage 32. Herein, the intake air passing through the control valve 30 is supplied only from the intake valves 2a, 2b at the wall side of the combustion chamber 1. With this structure, as stated above, the fuel mist 5 is not blown out, but the swirl 34 can be formed effectively.

In a driving range where output is necessary, the opening degree of the control valve 30 becomes large, the control valve 30 separates from the projection wall 31, and the air flows from both intake passages 32. In this fourth embodiment according to the present invention, the control valve 30 can serve as a throttle valve. In the case where the air-fuel ratio (A/F) assumes the lean condition, since the load of the internal combustion engine is small, an opening degree of the throttle valve is small.

Therefore, when the opening degree of the throttle valve is small, according to the operation of the projection wall 31, the intake air flows in a reversal direction as it is directed against the projection wall 31. The swirl 34 can be generated in the combustion chamber 1 according to the above stated intake air.

Where the load of the internal combustion engine becomes even larger, since the opening degree of the throttle valve is large, the control valve 30 separates from the projection wall 31 and then the intake air flows from both sides of the control valve 30. In this case, lean driving is not carried out, even in the lean driving the air-fuel ratio (A/F) is established to not be very large. With the above structure shown in FIG. 9, the control valve 30 for controlling the swirl 34 can serve as the throttle valve.

In a multi-cylinder type internal combustion engine, the control valve 30 is provided on an independent intake pipe 6 of the respective cylinder of the engine. Namely, the number of the control valves 30 corresponds to the number of cylinders.

Figure 10A:
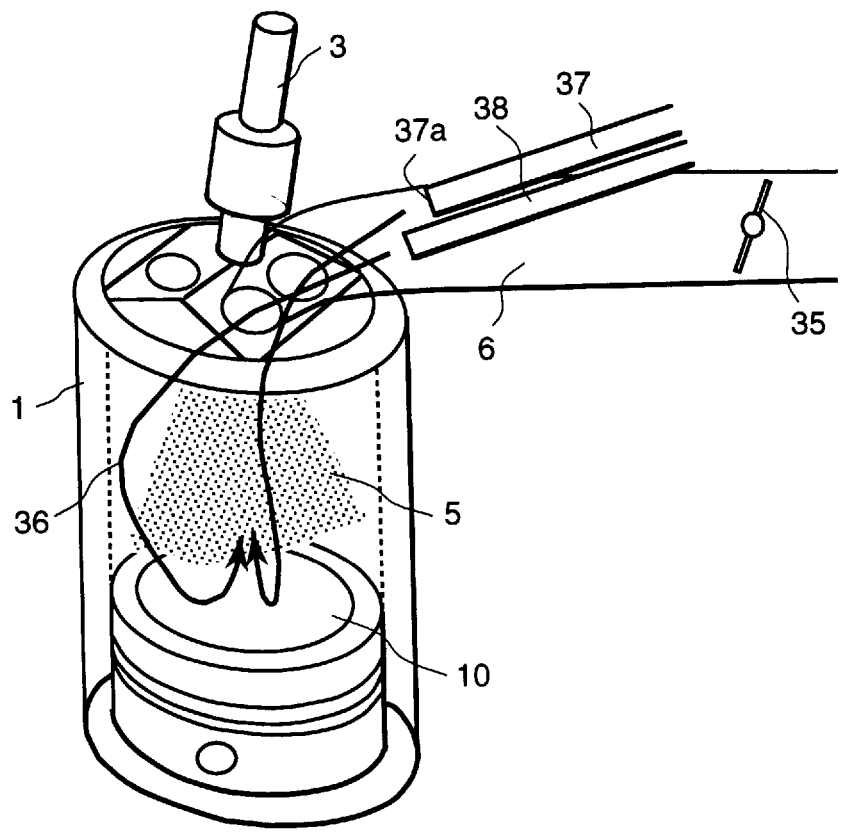
FIG. 10A is a schematically structural perspective view showing a fifth embodiment of an intake system of a direct fuel injection internal combustion engine according to the present invention.
Figure 10B:
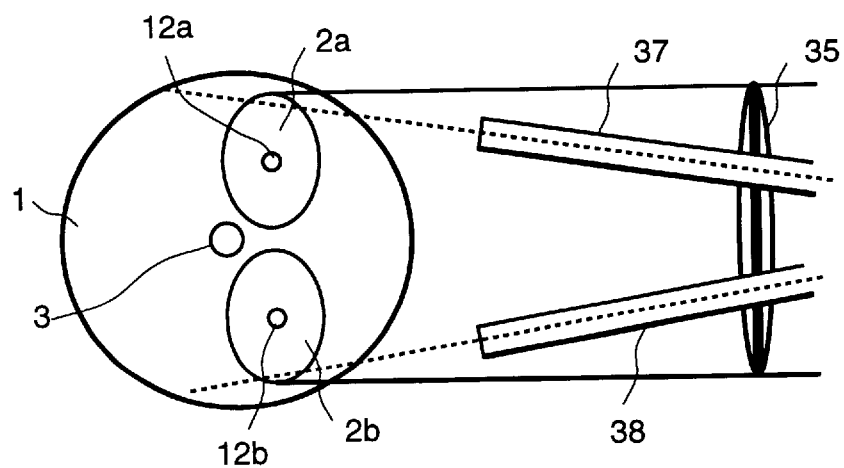
FIG. 10B is a schematically structural plan view showing a fifth embodiment of an intake system of a direct fuel injection internal combustion engine according to the present invention.

FIG. 10A and FIG. 10B show a fifth embodiment of an intake system in a method for stratifying an air-fuel ratio in a direct fuel injection internal combustion engine and an electronic system engine control apparatus in a direct fuel injection internal combustion engine according to the present invention. A control valve 35 is provided on the intake pipe 6. Two auxiliary passages 37, 38 are provided by bypassing the control valve 35. The two auxiliary passages 37, 38 form an air flow 36 in the combustion chamber 1.

After the air flow 36 enters into the combustion chamber 1, the air flow 36 reaches to a head portion of the piston 10 along the wall of the combustion chamber 1, after which the air flow is reflected by the piston 10 and forms a blow up shape. This air flow 36 is determined by the air blow-out directions of the two auxiliary passages 37, 38.

As shown in FIG. 10B, the internal combustion engine has the two auxiliary passages 37, 38 with respect to the two intake valves 2a, 2b and both outlets of the two auxiliary passages 37, 38 are directed toward a wall side of the combustion chamber 1 with respect to valve stems 12a, 12b of the intake valves 2. With the above structure, as seen in plan view a counter flow along to the wall of the combustion chamber 1 can form.

Further, as shown in FIG. 10A, the direction of an outlet portion 37a of the auxiliary passage 37a is downward to have a flow line with respect to the direction of a flow line of the intake pipe 6. With this structure, a downward flow forms in the combustion chamber 1, and the air flow 36 in the combustion chamber 1 collides with the lower portion of the piston 10 and flows reversibly and then forms the blow-up flow.

As a result, the fuel mist 5 concentrates to the upper portion of the combustion chamber 1. During the control valve 35 closure, the air flow 36 for being blown up in the combustion chamber 1 forms, then the fuel is stratified. In this case, for the reasons shown in FIG. 5, the fuel particle size diameter of the fuel mist 5 is desirably 30 μm.

Further, by virtue of what is shown in the relationship graph of the movement of the piston shown in FIG. 3 and FIG. 4, the fuel mist speed is desirably less than 37 m/s. Further, as stated above, the upper portion space at the bottom dead center of the piston 10 must be filled up, the fuel mist speed is desirably more than 5 m/s as shown in FIG. 3.

Figure 11A:
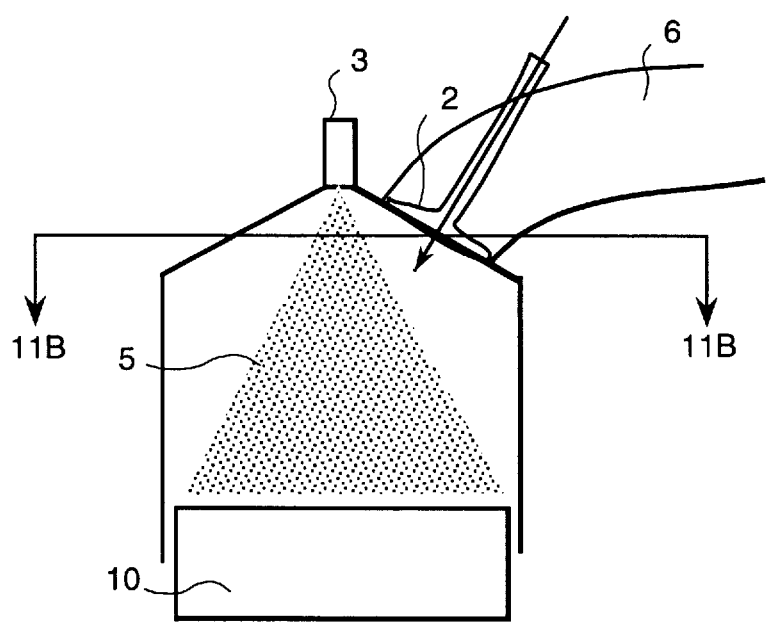
FIG. 11A is an explanatory view showing a relationship between an injection and an air flow.
Figure 11B:
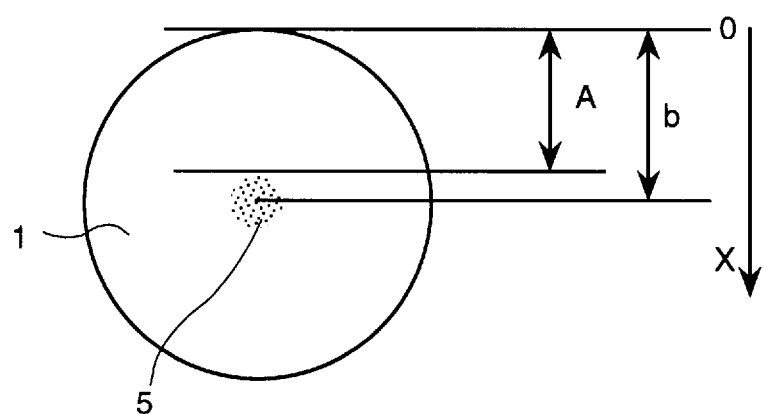
FIG. 11B is an explanatory view showing a relationship between the fuel mist and an air flow taken along to a line 11B—11B in FIG. 11A.

FIG. 11A and FIG. 11B show the relationship between the intake air and the fuel mist. The basic operation is that the intake air does not directly strike the fuel mist 5. In a case where the fuel injector 3 is arranged on the upper portion of the combustion chamber 1, when the piston 10 is at the lowest portion (BDC; bottom dead center), as shown in FIG. 11A, ideally the fuel mist 5 forms a conical shape connecting the injection point of the fuel injector 3 and the outer periphery of the piston 10.

In a case where the fuel mist 5 strikes the wall face of the combustion chamber 1, the temperature at the strike portion is reduced, and since the fuel does not evaporate, HC and soot are generated. For the above reasons, as shown in FIG. 11A, the fuel mist 5 must strike only the head portion of the piston 10. The temperature at the head portion of the piston is high, so that the collided fuel evaporates quickly and HC and the soot generation is greatly reduced.

Next, a method for introducing the intake air will be explained. As stated above, the intake air can stratify easily where the intake air does not strike the fuel mist 5.

The fuel mist 5 will be explained referring to FIG. 11A and FIG. 11B. FIG. 11B shows a cross-section of a plane face 11B—11B of FIG. 11A which passes through the intake valve 2 at a center point of the side face of the combustion chamber 1 and is drawn parallel to the head portion of the piston 10. As shown in FIG. 11B, the distance between the center portion of the fuel mist 5 and the outer puerperal portion of the combustion chamber 1 is indicted by b.

In this case the fuel mist 5 is positioned at a vicinity of the center portion of the combustion chamber 1 as shown in FIG. 11B. Herein, so as to not strike the intake air with the fuel mist 5, the intake air is supplied preferably to a region of A in FIG. 11B. The above fact can be attained with the intake pipe structure. At least the direction of the intake air in the intake pipe 6 is aimed at the above region A.

Figure 12:
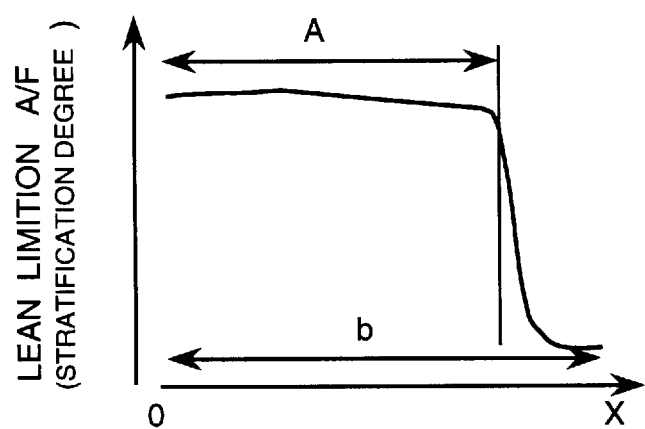
FIG. 12 is an explanatory graph showing a relationship between a lean limitation air-fuel ratio and an intake air supply region.

FIG. 12 shows a relationship graph between the distance X from the wall of the combustion chamber and the lean limitation air-fuel ratio (the lean limitation A/F) for indicating the stratification degree. As shown in FIG. 12, where the intake air is concentrated within the region A the limitation air-fuel ratio is made larger. When the supply position of the intake air exceeds the region A, the fuel mist 5 bends according to the intake air, and the limitation air-fuel ratio is abruptly lowered.

Figure 13:
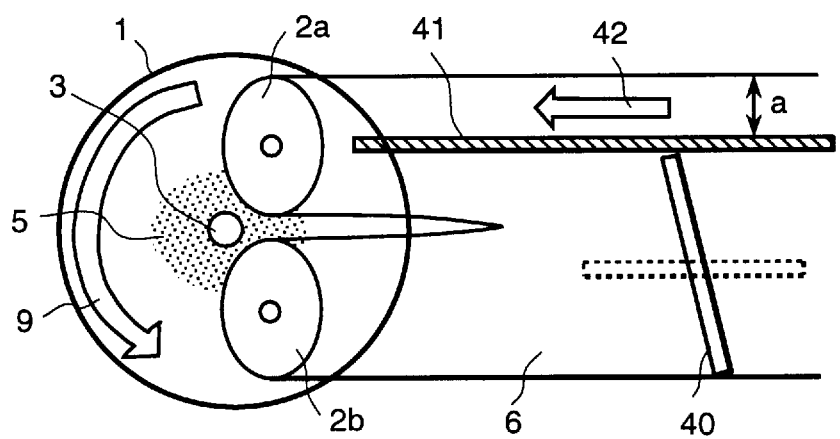
FIG. 13 is a schematically structural plan view showing a sixth embodiment of an intake system of a direct fuel injection internal combustion engine according to the present invention.

FIG. 13 shows a sixth embodiment of the intake pipe for supplying the intake air to the region A according to the present invention. A partition wall 41 and a control valve 40 are provided in the intake pipe 6. When the control valve 40 closes, an intake air 42 flows a cross-section area having a height a which exists at an upper portion of the partition wall 41 of the intake pipe 6 and is formed at an opposite side of the installation position of the control valve 40 of the intake pipe 6.

When the combustion chamber 1 is seen from the upper side, the cross-sectional area having the height a on the upper portion of the partition wall 41 is determined by not striking an intake air 42 with the fuel mist 5, and then the installation position of the partition wall 41 is determined suitably. In this case, the fuel mist 5 seen from the upper side shows a cross-sectional position where the fuel mist 5 cuts at a face in which the fuel mist 5 passes through the center position of the intake valves 2a, 2b explained in FIG. 11A and FIG. 11B.

Namely, it is important to establish the installation position of the partition wall 41 such that a≦A. For confirming the cross-sectional position of the partition wall 41, for example, there a method in which the fuel injector 3 injects at the atmospheric air and an electronic flash irradiates the fuel mist 5, and then the fuel mist 5 is photographed so that the cross-sectional installation position of the partition wall 41 is determined.

Figure 14:
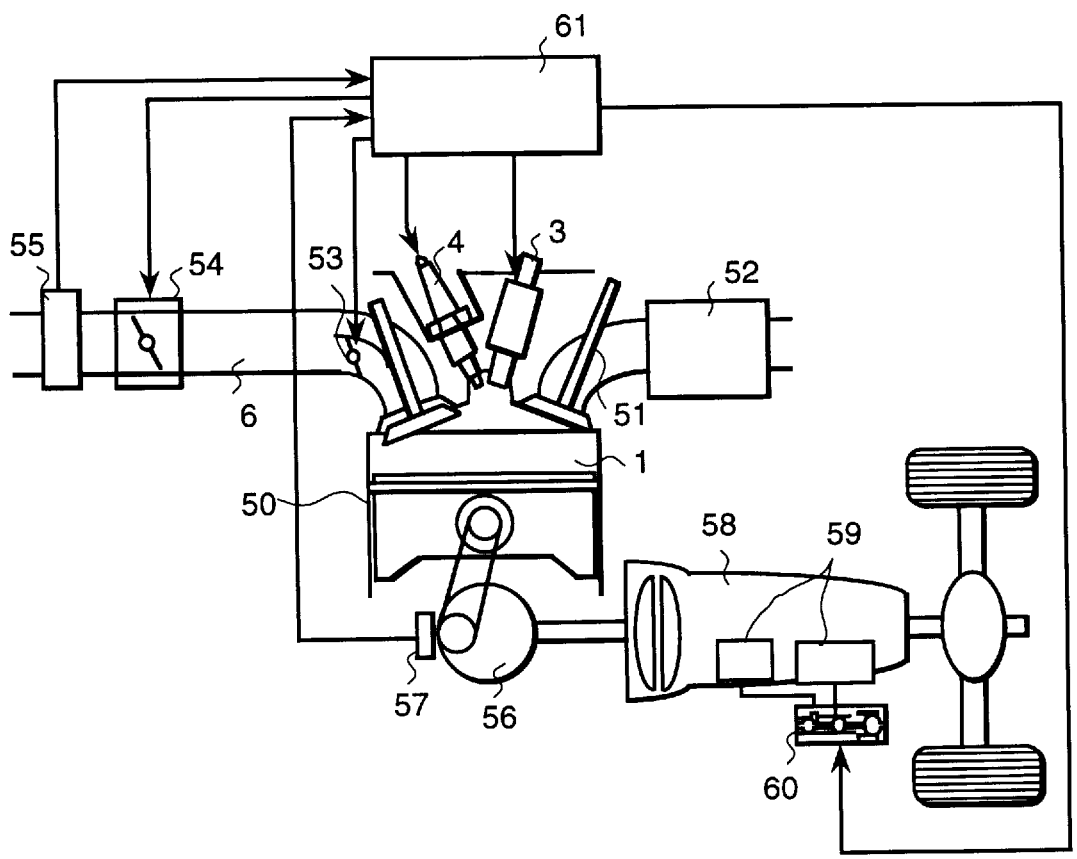
FIG. 14 is a power train system on which a direct fuel injection internal combustion engine according to the present invention is mounted.

FIG. 14 shows a power train system structure including the direct fuel injection internal combustion engine 50 according to the present invention. A catalyst 52 is provided on an exhaust pipe 51. Since the internal combustion engine itself 50 stratifies and carries out lean burn driving, the catalyst 52 preferably has a function of reducing NOx in an oxidizing atmosphere.

As the reducing agent, a common HC (unburned combustible hydrocarbon) is employed. An apparatus 53 for generating the swirl is provided in the intake pipe 6. This intake air apparatus shows the structure of FIG. 1A, FIG. 1B and FIG. 13, for example. Further, an electronic throttle valve 54 and an airflow meter 55 for measuring an air amount are provided in the internal combustion engine 50 in the intake pipe 6.

The internal combustion engine 50 has the fuel injector 3 and the ignition plug 4. A crank angle detection sensor 57 is provided on an output shaft 56 of the internal combustion engine 50. Further, the internal combustion engine 50 has a hydraulic pressure control valve 60, and this control valve 60 changes over directly a gear apparatus 59 of a transmission mechanism 58.

The internal combustion engine 50 has a controller 61 for controlling integrally the above stated sensors and actuators through the appropriate wiring. The airflow meter 55 detects the inhale or intake air amount, and the fuel corresponding the intake air amount is injected from the fuel injector 3.

After that the spark is formed by the ignition plug 4 at the ignition timing and the air-fuel mixture sparks. The crank angle detection sensor 57 provides signals for these various timings. To perform the torque control during the lean burn time, the electronic throttle valve 54 controls freely the inhale (intake) air amount. Further, a gear ratio of the transmission mechanism 58 is controlled to control the torque being transmitted to the wheels.

Figure 15A:
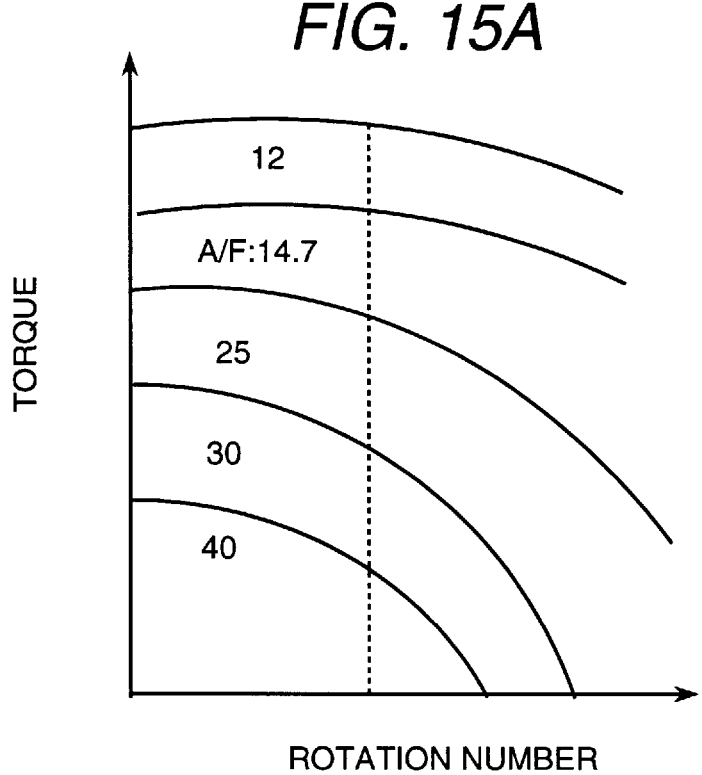
FIG. 15A is a basic operation map showing a relationship of an air-fuel ratio between rotation number and the torque.

FIG. 15A shows a map of the air-fuel ratio which is stored in the controller 61 where the direct fuel injection internal combustion engine is driven. The air-fuel ratio (A/F) is stored by the rotation number and the engine torque. In case of the low rotation number and the low torque, the fuel is stratified and the air-fuel ratio (A/F) is established as more than 40, and then the lean burn driving is performed. As the torque becomes larger, the air-fuel ratio (A/F) becomes smaller. In case where the torque is required, the air-fuel ratio (A/F) is established at 12 as the rich region.

Figure 15B:
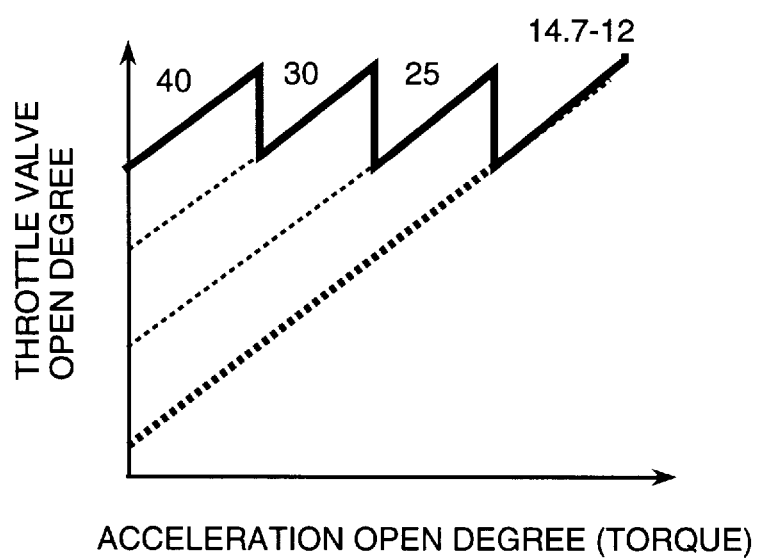
FIG. 15B is a basic operation map showing a relationship of an air-fuel ratio between an acceleration pedal opening degree (torque) and a throttle valve opening degree.

FIG. 15B shows a relationship graph between an acceleration pedal opening degree (torque) and a throttle valve opening degree. The acceleration pedal opening degree is proportional to the torque. In a normal engine, as shown in a bold dot line, an acceleration pedal opening degree and the throttle valve opening degree has a relationship of 1 to 1.

According to the present invention, as shown in FIG. 15B, the relationship between the acceleration pedal opening degree and the throttle valve opening degree is established gradually in accordance with the established acceleration pedal opening degree and in accordance with the electronic throttle valve.

For example, in the case where the air-fuel ratio (A/F) is 40, to compensate for the lowering of the torque, the throttle valve opens to a large degree and then the air amount is increased. In the case where the air-fuel ratio (A/F) goes from 40 to 30, the fuel amount remains constant and as shown in FIG. 15B, the throttle valve opening degree is reduced by the electronic throttle valve, after which the air-fuel ratio (A/F) is established at 30. In the above stated manner, the driving without step shape torque can be carried out.

Figure 16:
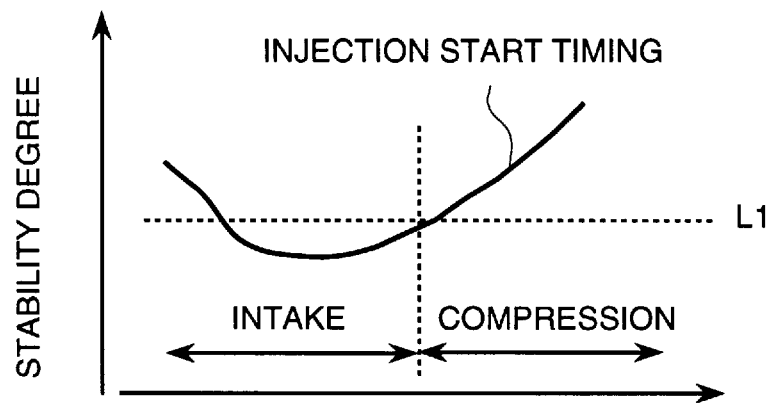
FIG. 16 is a graph showing a relationship between an injection timing and a lean limitation air-fuel ratio.

FIG. 16 shows a relationship graph between the fuel injection start timing and the engine stability degree. The engine stability degree has to be established to an amount less than a linear line L1. As understood from the characteristic shown in FIG. 16, the injection timing has to be established during the intake stroke operation.

FIG. 17A shows one control flowchart stored in programs in the controller 61. The air amount is measured by the airflow meter 55 in a step 100, and a present rotation number and a present torque are read out in a step 101.

The torque is judged from the acceleration opening degree. The stored established air-fuel ratio (A/F) is read out in a step 102 and after that the fuel amount, namely the fuel injection time width, and a necessary air amount for obtaining a throttle valve opening degree are determined in order in a step 103 and in a step 104. The throttle valve opening degree is executed from the target torque in a step 105.

Next, the fuel injection timing and the ignition timing, and the gear shift ratio of the transmission mechanism are determined in order in a step 106 and in a step 107. The respective determined values are outputted to the electronic throttle valve 54, the fuel injector 3, the ignition plug 4, and the hydraulic control valve 60 taking into account the timings in a step 108.

Further, FIG. 17B shows another control flow where the swirl strength varies by the established air-fuel ratio (A/F). As stated in FIG. 7, since the engine stability degree of the direct fuel injection internal combustion engine varies with the swirl ratio (the swirl strength), the lean limitation air-fuel ratio (the lean limitation A/F) varies.

The air amount is measured by the airflow meter 55 in a step 110 and a present rotation number and a present torque are read out in a step 111. The torque is judged from the acceleration opening degree. The stored established air-fuel ratio (A/F) is read out in a step 112. Herein, the swirl strength adopts positively to the control. In case the established air-fuel ratio (A/F) is determined, the swirl strength is determined at a step 113.

After that the fuel amount, namely the fuel injection time width and a necessary air amount for obtaining a throttle valve opening degree are determined in order in a step 114 and in a step 115. The throttle valve opening degree is executed from the target torque in a step 116. Next, the fuel injection timing, the ignition timing, and the gear shift ratio of the transmission mechanism are determined in order in a step 117 and in a step 118.

The opening degree of the control valve for the swirl, which corresponds to the above swirl strength, is output to the apparatus 53 shown in FIG. 14 in a step 119. In the apparatus 53, the control valve is controlled by the electronic control or the negative pressure control etc., and the opening degree of the control valve having a desired swirl is established. The respective determined values are outputted to the electronic throttle valve 54, the fuel injector 3, the ignition plug 4, and the hydraulic control valve 60 taking into account the timings in a step 120.

Figure 18A:
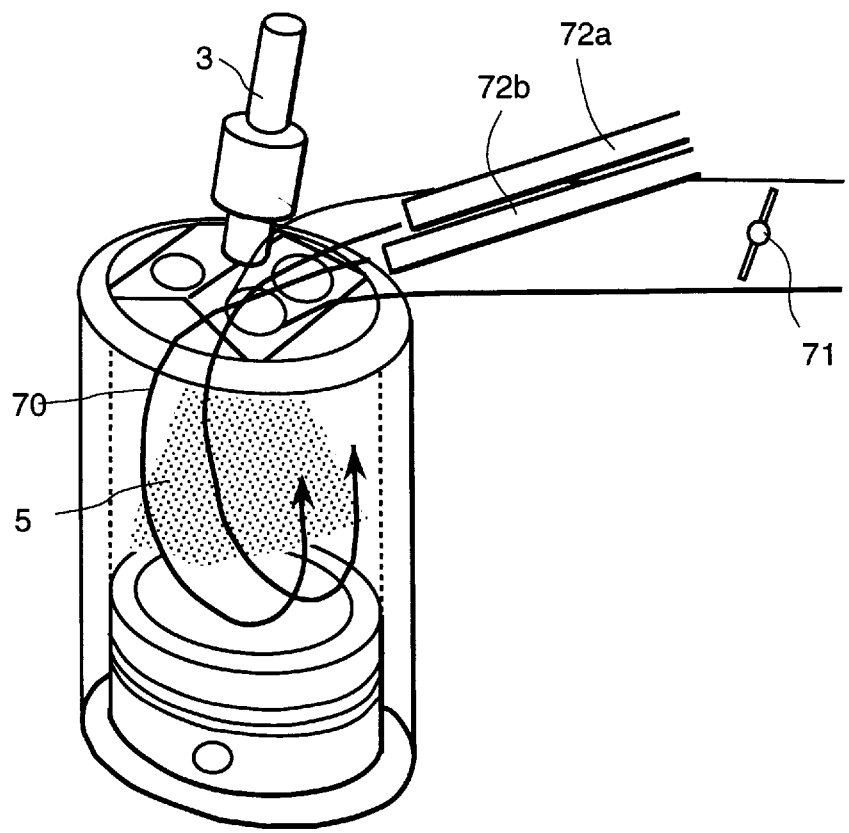
FIG. 18A is a schematically structural perspective view showing a seventh embodiment of an intake system of a direct fuel injection internal combustion engine according to the present invention.
Figure 18B:
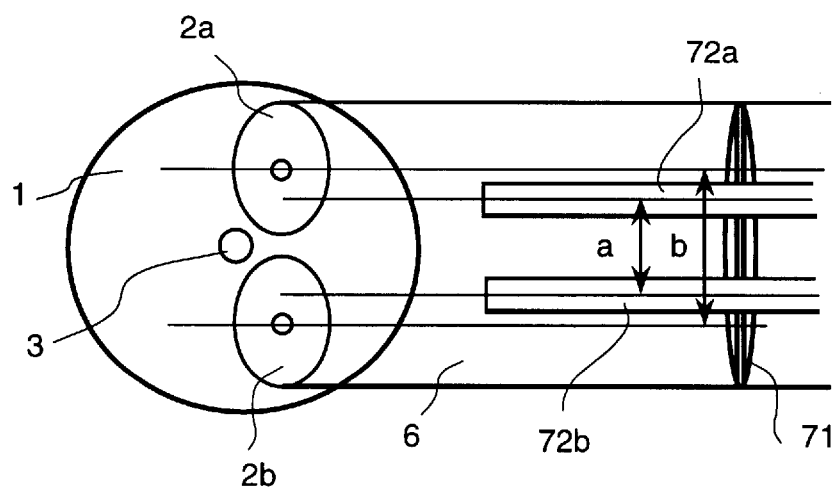
FIG. 18B is a schematically structural plan view showing a seventh embodiment of an intake system of a direct fuel injection internal combustion engine according to the present invention.

FIG. 18A and FIG. 18B show a seventh embodiment of an intake system in a direct fuel internal combustion engine according to the present invention. The method employed in FIG. 18A and FIG. 18B is an alternative embodiment of the method shown in FIG. 10. In a method shown in FIG. 18A and 18B, a lengthwise direction swirl 70 is generated in the combustion chamber 1, and the fuel mist 5 is concentrated at the upper side of the combustion 20 chamber 1.

Herein, to generate the strong lengthwise component swirl (tumble flow) 70, two auxiliary passages 72a, 72b which bypass a control valve 71 are arranged in parallel. The tumble flow 70 has the lengthwise component as a main component. Further, a center distance a between two auxiliary passages 72a, 72b is sized smaller than a center distance b between two valve stems 12a, 12b.

With the above stated structure, since the air flow passes through the inside of the intake valve 2, the strong tumble flow 70 is formed at the center portion of the combustion chamber 1, and by the blow-up flow forms the fuel mist 5 at the upper portion of the combustion chamber 1.

Figure 19:
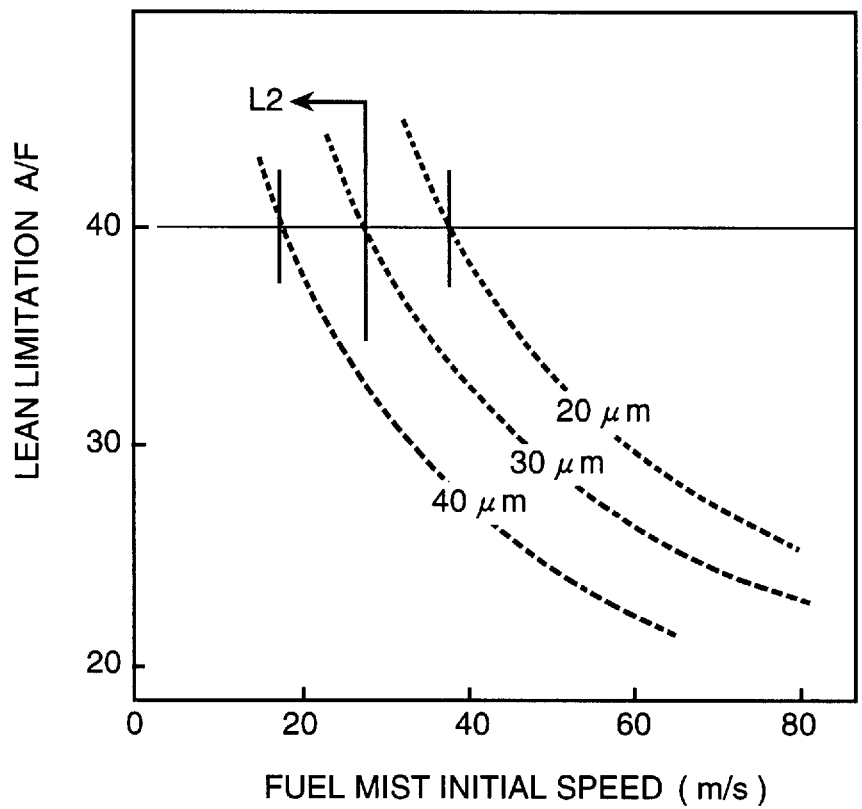
FIG. 19 is a graph showing a relationship between a lean limitation air-fuel ratio and a fuel mist speed.

FIG. 19 is a relationship graph between the fuel mist speed and the lean limitation requested by the experimentation where the fuel mist particle size diameter varies.

In the above case, the fuel mist size diameter is 30 μm as previously stated, and to exceed the lean limitation air-fuel ratio (the lean limitation A/F) of more than 40, the fuel mist speed has to be less than 25 m/s, namely to the left side of a line L2 in FIG. 19. By making the lean limitation air-fuel ratio (the lean limitation A/F) more than 40, the improvement room in fuel consumption becomes large. Further, when the fuel mist size diameter is 30 μm, the fuel mist speed has to be less than 38 m/s. Similarly, when the fuel mist size diameter is 40 μm, the fuel mist speed has to be less than 17 m/s.

As stated above, even when the fuel mist size diameter is large, by lowering the fuel mist speed, the lean limitation air-fuel ratio (the lean limitation A/F) of more than 40 can be attained. When the fuel mist particle size diameter and the fuel mist speed of the fuel injector are measured, and then the fuel mist particle size diameter and the fuel mist speed are covered by the range shown in FIG. 19. The above condition is a necessary condition for enlarging the lean limitation.

Figure 20A:
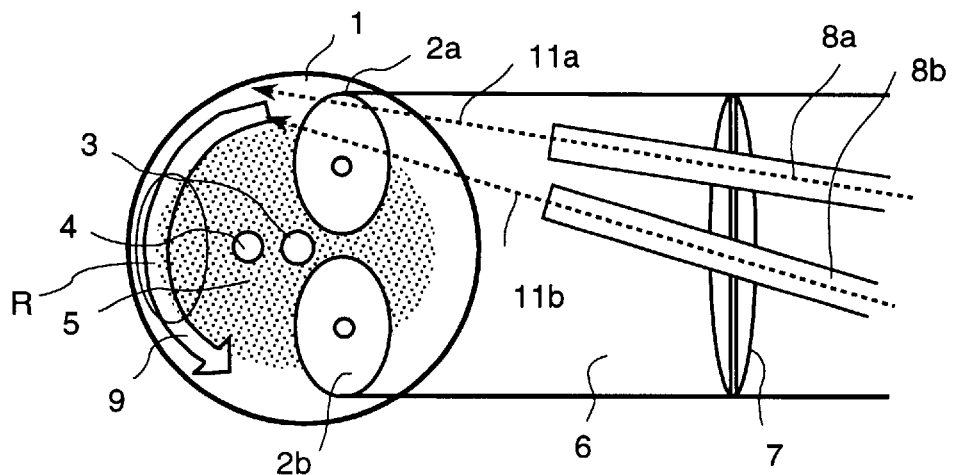
FIG. 20A is a schematically structural plan view showing an eighth embodiment of an intake system of a direct fuel injection internal combustion engine according to the present invention.
Figure 20B:
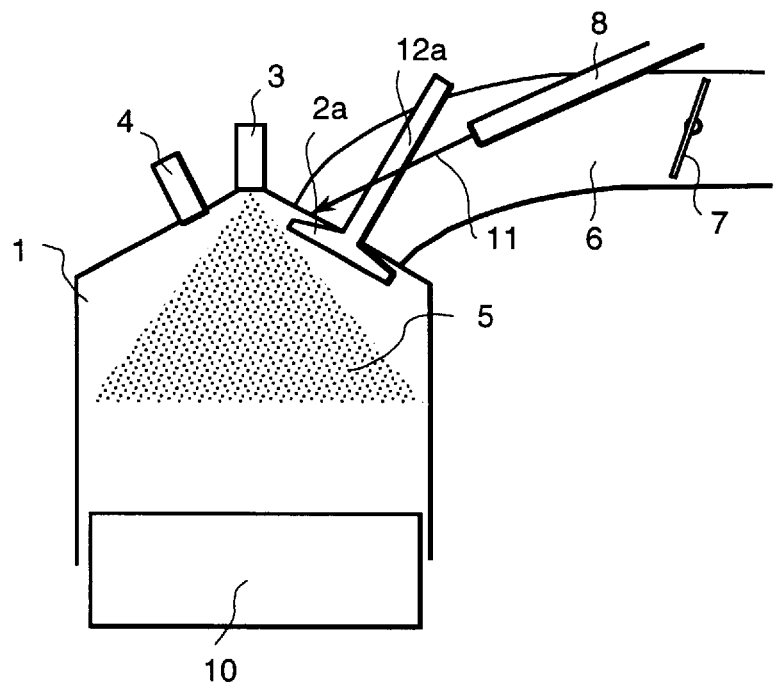
FIG. 20B is a schematically structural side view showing an eighth embodiment of an intake system of a direct fuel injection internal combustion engine according to the present invention.

FIG. 20A and FIG. 20B show an eighth embodiment of an intake system in a method for stratifying an air-fuel ratio in a direct fuel injection internal combustion engine and an electronic system engine control apparatus in a direct fuel injection internal combustion engine according to the present invention. The angle of the fuel mist 5 is made larger than that of the first embodiment shown in FIG. 1A and FIG. 1B. A small amount fuel is mixed with the swirl 9 of an outer peripheral portion of the fuel mist 5 as shown in an ellipse R in FIG. 20A.

With the above stated method, the rich air-fuel mixture can exist at the center portion of the combustion chamber 1 and a very low concentration air-fuel mixture can exist in the swirl 9 of the peripheral portion of the combustion chamber 1. As a result, the spark operation can be carried out surely, and the propagation of the fire after the spark operation can be promoted by the thin air-fuel mixture.

In this case, the low concentration air-fuel mixture can spark according to the fire at the center portion of the combustion chamber 1, and even in the atmosphere of the low concentration air-fuel mixture the combustion can be carried out stable.

According to the present invention, the swirl shape (the swirl strength) and the fuel mist speed can be selected suitably, and then the fuel mist does not strike with the head portion of the piston.

The stratified rich air-fuel mixture reaches to the air-fuel ratio (A/F) of more than 25, and accordingly the lean combustion can be obtained. The lean limitation air-fuel ratio (the lean limitation A/F) can be enlarged, and the lean limitation air-fuel ratio (the lean limitation A/F) becomes more than 40, so that accordingly the lean combustion exceeding the homogeneous combustion can be achieved. According to the present invention, NOx discharge amount is reduced even at the lean condition.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for combusting an air-fuel mixture in a direct fuel injection internal combustion engine in which a dense air-fuel mixture having a large mixture rate of fuel at a center portion of a swirl formed in a cylinder is collected and ignited, wherein a strength of said swirl is from 1 to 3.5.

2. A method for combusting an air-fuel mixture in a direct fuel injection internal combustion engine according to claim 1, wherein said swirl is formed by an airflow which is supplied to said cylinder.

3. A method for combusting an air-fuel mixture in a direct fuel injection internal combustion engine in which the air-fuel mixture is formed by generating a swirl of air in a combustion chamber of the direct fuel injection internal combustion engine and by injecting directly fuel in said combustion chamber, the combustion being carried out using the air-fuel mixture, comprising steps of:

generating a swirl at an inner surrounding portion of said combustion chamber by air which is inhaled in said combustion chamber;

injecting the fuel toward a center portion of said swirl using an injector;

forming a rich air-fuel mixture at a center region of said combustion chamber, said rich air-fuel mixture having a weight ratio between the air and the fuel of substantially 14.7, and forming a lean air-fuel mixture at a swirl existence region, said lean air-fuel mixture having a weight ratio between the air and the fuel of more than 14.7; and forming a swirl strength from 1 to 3.5, said swirl strength being defined by a number of a swirl with one reciprocation of a piston of the direct fuel injection internal combustion engine;

whereby the direct fuel injection internal combustion engine is controlled to carry out a lean burn combustion.

4. A method for combusting an air-fuel mixture in a direct fuel injection internal combustion engine according to claim 3, further comprising the step of controlling said swirl generated in said combustion chamber using a control valve which is provided on an airflow passage in which the air is inhaled in said combustion chamber to change a cross-section area of said airflow passage and a throttle valve which controls the amount of the air which is inhaled in the direct fuel injection combustion engine.

5. A method for combusting an air-fuel mixture in a direct fuel injection internal combustion engine in which an air-fuel mixture is formed by generating a swirl of air in a combustion chamber of the direct fuel internal combustion engine and by injecting fuel, the combustion being carried out using the air-fuel mixture, comprising steps of:

generating a lateral component swirl at a surrounding portion of said combustion chamber by air which is inhaled in said combustion chamber;

fuel-misting the fuel toward a center portion of said lateral component swirl using an injector;

forming a rich air-fuel mixture at a center region of said combustion chamber, said rich air-fuel having a weight ratio between the air and the fuel of substantially 14.7 and forming a lean air-fuel mixture at said lateral component swirl existence region, said lean air-fuel ratio having a weight ratio between the air and the fuel of more than 14.7;

forming a swirl strength from 1 to 3.5, said swirl strength being defined by a number of said lateral component swirl with one reciprocation of a piston of the direct fuel injection internal combustion engine; component swirl with one reciprocation of a piston of the direct fuel injection internal combustion engine;

enclosing said rich air-fuel mixture by said lean air-fuel mixture directed to for a head portion of said piston from said injector;

forming the fuel mist speed of the fuel at 5–37 m/s, said fuel being fuel-misted in said combustion chamber and having an average particle size diameter of less than 30 μm;

recognizing a weight ratio between an amount of the air and an amount of the fuel mist of the fuel as a low concentration combustion limitation when the above stated conditions are satisfied; and controlling the combustion of the direct fuel injection internal combustion engine using said obtained value of said low concentration combustion limitation.

6. A method for combusting an air-fuel mixture in a direct fuel injection internal combustion engine according to claim 5, further comprising the step of fuel-misting a very small amount of the fuel to an outer peripheral portion of said lateral component swirl.

7. A method for combusting an air-fuel mixture in a direct fuel injection internal combustion engine in which an air-fuel mixture is formed by generating a swirl of air in a combustion chamber of the direct fuel injection internal combustion engine and by injecting fuel, the combustion being carried out using the air-fuel mixture, comprising steps of:

generating a lateral component swirl at a surrounding portion of said combustion chamber by air which is inhaled in said combustion chamber;

fuel-misting the fuel toward a center portion of said lateral component swirl using an injector;

forming a rich air-fuel mixture at a center region of said combustion chamber, said rich air-fuel having a weight ratio between the air and the fuel of substantially 14.7, and forming a lean air-fuel mixture at said lateral component swirl existence region, said lean air-fuel ratio having a weight ratio between the air and the fuel of more than 14.7;

forming a swirl strength from 1 to 3.5, said swirl strength being defined by a number of said lateral component swirl with one reciprocation of a piston of the direct fuel injection internal combustion engine;

enclosing said rich air-fuel mixture by said lean air-fuel mixture directed to a head portion of said piston from said injector;

forming the fuel mist speed of the fuel at 5–25 m/s, said fuel misted being in said combustion chamber and having an average particle size diameter of less than 30 μm;

recognizing a weight ratio between an amount of the air and an amount of the fuel mist as a low concentration combustion limitation when the above stated conditions are satisfied;

forming the weight ratio between said amount of the air and said amount of the fuel mist of the fuel of more than 40 at a region where the combustion in said low concentration combustion limitation is carried out; and controlling the combustion of the direct fuel injection internal combustion engine using said obtained value of said low concentration combustion limitation and an obtained value of the weight ratio between said amount of the air and said amount of the fuel mist of the fuel.

8. A method for combusting an air-fuel mixture in a direct fuel injection internal combustion engine according to claim 7, further comprising the step of fuel-misting a very small amount of the fuel to an outer peripheral portion of said lateral component swirl.

9. A method for combusting an air-fuel mixture in a direct fuel injection internal combustion engine in which an air-fuel mixture is formed by generating a swirl of air in a combustion chamber of the direct fuel injection internal combustion engine and by injection fuel, the combustion being carried out using said air-fuel mixture, comprising steps of:

generating a vertical swirl at a surrounding portion of said combustion chamber by air which is inhaled in said combustion chamber;

fuel-misting the fuel toward a center portion of said lengthwise component swirl using an injector;

forming a rich air-fuel mixture at a center region of said combustion chamber, said rich air-fuel having a weight ratio between the air and the fuel of substantially 14.7, and forming a lean air-fuel mixture at said lengthwise component swirl existence region, said lean air-fuel ratio having a weight ratio between the air and the fuel of more than 14.7;

forming said lengthwise component swirl in a return direction directed from a head portion of a piston of the direct fuel injection internal combustion engine to said injector at a center region of said combustion chamber;

enclosing said rich air-fuel mixture by said lean air-fuel mixture directed to said head portion of said piston from said injector;

forming the fuel mist speed of the fuel at 5–35 m/s, said fuel being misted in said combustion chamber and having an average particle size diameter of less than 30 μm;

defining a weight ratio between an amount of the air and an amount of the fuel mist of the fuel as a low concentration combustion limitation when the above stated conditions are satisfied; and controlling the combustion of the direct fuel injection internal combustion engine using said obtained value of said low concentration combustion limitation.

10. A method for combusting an air-fuel mixture in a direct fuel injection internal combustion engine according to claim 9, further comprising the step of fuel-misting a very small amount of the fuel to an outer peripheral portion of said lengthwise component swirl.

11. A method for combusting an air-fuel mixture in a direct fuel injection internal combustion engine in which an air-fuel mixture is formed by generating a swirl of air in a combustion chamber of the direct fuel injection internal combustion engine and by injecting fuel, the combustion being carried out using said air-fuel mixture, comprising steps of:

generating a lengthwise component swirl at a surrounding portion of said combustion chamber by air which is inhaled in said combustion chamber;

fuel-misting the fuel toward a center portion of said lengthwise component swirl using an injector;

forming a rich air-fuel mixture at a center region of said combustion chamber, said rich air-fuel having a weight ratio between the air and the fuel of substantially 14.7, and forming a lean air-fuel mixture at said lengthwise component swirl existence region, said lean air-fuel ratio having a weight ratio between the air and the fuel of more than 14.7;

forming said lengthwise component swirl in a return direction directed from a head portion of a piston of the direct fuel injection internal combustion engine to said injector at a center region of said combustion chamber;

enclosing said rich air-fuel mixture by said lean air-fuel mixture directed to said head portion of said piston from said injector;

forming the fuel mist speed of the fuel at 5–25 m/s, said fuel being misted in said combustion chamber and having an average particle size diameter of less than 30 μm;

defining the weight ratio between said amount of the air and said amount of the fuel mist of the fuel as a low concentration combustion limitation when the above stated conditions are satisfied; and controlling the combustion of the direct fuel injection internal combustion engine using said obtained value of said low concentration combustion limitation and an obtained value of the weight ratio between said amount of the air and said amount of the fuel mist of the fuel.

12. A method for combusting an air-fuel mixture in a direct fuel injection internal combustion engine according to claim 11,
further comprising the
step of fuel-misting a very small amount of the fuel to an outer peripheral portion of said lengthwise component swirl.

13. A method for combusting an air-fuel mixture in a direct fuel injection internal combustion engine in which said air-fuel mixture is formed by generating a swirl of air in a combustion chamber and by injecting fuel, comprising steps of:

generating a lateral component swirl in said combustion chamber at a surrounding portion of said combustion chamber by air which is inhaled in said combustion chamber;

injecting the fuel toward a center portion of said lateral component swirl using an injector;

forming a rich air-fuel mixture at a center region of said combustion chamber, said rich air-fuel mixture having a weight ratio between the air and the fuel of substantially 14.7, and forming a lean air-fuel mixture at a lateral component swirl existence region, said lean air-fuel mixture having a weight ratio between the air and the fuel of more than 14.7;

forming a swirl strength from 1 to 3.5, said swirl strength being defined by a number of said lateral component swirl with one reciprocation of a piston of the direct fuel injection internal combustion engine; and forming a fuel mist speed of the fuel at 5–37 m/s, said fuel being fuel-misted in said combustion chamber having an average particle size diameter of less than 30 μm;

whereby the direct fuel injection internal combustion engine is carried out a lean burn combustion.

14. A method for combusting an air-fuel mixture in a direct fuel injection internal combustion engine according to claim 13, further comprising:

fuel-misting a very small amount of the fuel to an outer peripheral portion of said lateral component swirl.

15. A method for combusting an air-fuel mixture in a direct fuel injection internal combustion engine in which said air-fuel mixture is formed by generating a swirl of air in a combustion chamber and by injecting fuel, comprising steps of:

generating a lateral component swirl in said combustion chamber at a surrounding portion of said combustion chamber by air which is inhaled in said combustion chamber;

injecting the fuel toward a center portion of said lateral component swirl using an injector;

forming a rich air-fuel mixture at a center region of said combustion chamber, said rich air-fuel mixture having a weight ratio between the air and the fuel of substantially 14.7, and forming a lean air-fuel mixture at a lateral component swirl existence region, said lean air-fuel mixture having a weight ratio between the air and the fuel of more than 14.7;

forming a swirl strength from 1 to 3.5, said swirl strength being defined by a number of said lateral component swirl with one reciprocation of a piston of the direct fuel injection internal combustion engine; and forming a fuel mist speed of the fuel at 5–25 m/s, said fuel being fuel-misted in said combustion chamber having an average particle size diameter of less than 30 μm;

forming a weight ratio between an amount of the air and an amount of the fuel mist of the fuel of more than 40;

whereby the direct fuel injection internal combustion engine is carried out a lean burn combustion.

16. A method for combusting an air-fuel mixture in a direct fuel injection internal combustion engine in which said air-fuel mixture is formed by generating a swirl of air in a combustion chamber and by injecting fuel, comprising steps of:

generating a lengthwise component swirl in said combustion chamber at a surrounding portion of said combustion chamber by air which is inhaled in said combustion chamber;

injecting the fuel toward a center portion of said lengthwise component swirl using an injector;

forming a rich air-fuel mixture at a center region of said combustion chamber, said rich air-fuel mixture having a weight ratio between the air and the fuel of substantially 14.7, and forming a lean air-fuel mixture at a lengthwise component swirl existence region, said lean air-fuel mixture having a weight ratio between the air and the fuel of more than 14.7;

forming said lengthwise component swirl in a return direction directed from a head portion of a piston of the direct fuel injection internal combustion engine to said injector at a center region of said combustion chamber; and forming a fuel mist speed of the fuel at 5–35 m/s, said fuel being fuel-misted in said combustion chamber having an average particle size diameter of less than 30 μm;

whereby the direct fuel injection internal combustion engine is carried out a lean burn combustion.

17. A method for combusting an air-fuel mixture in a direct fuel injection internal combustion engine according to claim 16, further comprising fuel-misting a very small amount of the fuel to an outer peripheral portion of said lengthwise component swirl.

18. A method for combusting an air-fuel mixture in a direct fuel injection internal combustion engine in which said air-fuel mixture is formed by generating a swirl of air in a combustion chamber and by injecting fuel, comprising steps of:

generating a lengthwise component swirl in said combustion chamber at a surrounding portion of said combustion chamber by air which is inhaled in said combustion chamber;

injecting the fuel toward a center portion of said lengthwise component swirl using an injector;

forming a rich air-fuel mixture at a center region of said combustion chamber, said rich air-fuel mixture having a weight ratio between the air and the fuel of substantially 14.7, and forming a lean air-fuel mixture at a lengthwise component swirl existence region, said lean air-fuel mixture having a weight ratio between the air and the fuel of more than 14.7;

forming said lengthwise component swirl in a return direction directed from a head portion of a piston of the direct fuel injection internal combustion engine to said injector at a center region of said combustion chamber;

forming a fuel mist speed of the fuel at 5–25 m/s, said fuel being fuel-misted in said combustion chamber having an average particle size diameter of less than 30 $\mu$m; and forming a weight ratio between an amount of the air and an amount of the fuel mist of the fuel of more than 40;

whereby the direct fuel injection internal combustion engine is carried out a lean burn combustion.

19. An electronic system engine control apparatus in which an air-fuel mixture is formed by generating a swirl of air in a combustion chamber and by fuel-misting fuel and the obtained air-fuel mixture is used to stratify the air-fuel mixture of a direct fuel injection internal combustion engine in which combustion is carried out using said air-fuel mixture, comprising a target torque determination means for determining a target value of an output torque of the direct fuel injection internal combustion engine as a target torque;

a fuel supply amount determination means for determining a supply amount of the fuel according to an engine rotation speed of the direct fuel injection internal combustion engine and said target torque;

a target air-fuel ratio calculation means for calculating a target value of an air-fuel ratio as a target air-fuel ratio according to the engine rotation speed of the direct fuel injection internal combustion engine and said target torque;

a swirl strength calculation means for calculating a swirl strength according to said target air-fuel ratio;

a low concentration combustion region transfer judgment means for judging whether a combustion condition of the direct fuel injection internal combustion engine transfers or does not transfer from said target air-fuel ratio to the air-fuel ratio of more than 14.7 in a low concentration combustion region; and an air-fuel ratio control means for controlling the direct fuel injection internal combustion engine in which an actual air-fuel ratio of the direct fuel injection internal combustion engine becomes said target air-fuel ratio in accordance with a signal for indicating the fuel supply amount obtained according to said fuel supply amount determination means, a signal for indicating said swirl strength obtained according to said swirl strength calculation means and a signal for indicating said low concentration combustion region transfer obtained according to said low concentration combustion region transfer judgment means.

20. An electronic system engine control apparatus according to claim 19, further comprising a fuel injection means for injecting the fuel toward an outer peripheral portion of said swirl; and a fuel injection amount execution means for executing an injection amount of the fuel.

21. An electronic system engine control apparatus according to claim 19, further comprising a control valve arranged in an airflow passage of air to be inhaled in said combustion chamber and for varying a cross-section area in said airflow passage; and a throttle valve for controlling an amount of the air which is to be inhaled in the direct fuel injection internal combustion engine;

whereby said swirl generated in said combustion chamber is controlled by using said control valve and said throttle valve.

22. An electronic system engine control apparatus in which an air-fuel mixture is formed by generating a swirl of air in a combustion chamber and by injecting fuel comprising:

a target torque determination means for determining a target value of an output torque of the direct fuel injection internal combustion engine as a target torque;

a fuel supply amount determination means for determining a supply amount of the fuel according to an engine rotation speed of the direct fuel injection internal combustion engine and said target torque;

a target air-fuel ratio calculation means for calculating a target value of an air-fuel ratio according to the engine rotation speed of the direct fuel injection internal combustion engine and said target torque;

a swirl strength determination mean£ for determining a swirl strength according to said target air-fuel ratio; and a low concentration combustion region transfer judgment means for judging whether a combustion condition of the direct fuel injection internal combustion engine transfers or does not transfer from said target air-fuel ratio to an air-fuel ratio of more than 14.7 in a low concentration combustion region;

whereby the direct fuel injection internal combustion engine is controlled to become an actual air-fuel ratio of the direct fuel injection internal combustion engine to said target air-fuel ratio in accordance with a signal for indicating the fuel supply amount obtained according to said fuel supply amount determination means, a signal for indicating said swirl strength obtained according to said swirl strength determination means and a signal for indicating said low concentration combustion region transfer obtained according to said low concentration combustion region transfer judgment means.

23. An electronic system engine control apparatus according to claim 22, comprising a fuel injection means for injecting the fuel toward an outer peripheral portion of said swirl; and a fuel injection amount execution means fox executing an injection amount of the fuel.

24. An electronic system engine control apparatus according to claim 22, comprising a control valve arranged in an airflow passage of air to be inhaled in said combustion chamber and for varying a cross-section area in said airflow passage; and a throttle valve for controlling an amount of the air which is to be inhaled in the direct fuel injection internal combustion engine;

whereby said swirl generated in said combustion chamber is controlled by using said control valve and said throttle valve.

* * * * *